United States Patent Office 3,429,874
Patented Feb. 25, 1969

3,429,874
1-POLYHALOGENOALKYL-2-OXO-1,3-DIHYDRO-2H-1,4-BENZODIAZEPINES
John G. Topliss, West Caldwell, N.J., assignor to Schering Corporation, Bloomfield, N.J., a corporation of New Jersey
No Drawing. Continuation-in-part of application Ser. No. 603,737, Dec. 22, 1966. This application July 3, 1967, Ser. No. 650,581
U.S. Cl. 260—239.3                    11 Claims
Int. Cl. A61k 27/00; C07d 53/06

ABSTRACT OF THE DISCLOSURE

This invention relates to 2-oxo-1,3-dihydro-2H-1,4-dibenzodiazepines, and the 4-N-oxides thereof, having a polyfluoroalkyl radical attached at the 1-position thereof, to their use as muscle relaxants, as sedatives, an anticonvulsants, and as anti-anxiety agents and to the intermediates useful in the preparation thereof. The compounds may be prepared by N-polyfluoroalkylating the appropriately substituted 2 - oxo - 1,3 - dihydro - 2H-1,4-benzodiazepines. Alternate methods for the synthesis of the compounds of this invention are also described.

This application is a continuation-in-part application of my co-pending application Ser. No. 603,737, filed Dec. 22, 1966, which in turn is a continuation-in-part of my co-pending application Ser. No. 520,658, filed Jan. 14, 1966. Both co-pending applications are now abandoned.

FIELD OF INVENTION

This invention relates to compositions of matter identifiable in the art of chemistry as polyfluoroalkylated benzodiazepines, to the processes and intermediates useful in the preparation thereof, and to the therapeutic use of such benzodiazepines.

SUMMARY OF INVENTION

The invention sought to be patented, in its composition of matter aspects, may be described as X-substituted $1R_1$ - 2 - oxo - $3R_2R_3$ - $5R_4$ - 1,3 - dihydro-2H-1,4-benzodiazepines and as X-substituted $1R_1$-2-oxo-$3R_5R_6$-$5R_4$-1,3-dihydro-2H-1,4-benzodiazepine-4-oxides, and to acid addition salts of certain members thereof, wherein $R_1$ is polyfluoroalkyl, $R_2$ is hydrogen, lower alkyl, hydroxy or lower alkanoyloxy, $R_3$ is hydrogen or lower alkyl with the proviso that when $R_2$ is hydroxy or lower alkanoyloxy, $R_3$ is hydrogen, $R_4$ is a heterocycle, phenyl or halogeno, trifluoromethyl, lower alkyl, lower alkoxy and nitro substituted phenyl, and $R_5$ and $R_6$ are hydrogen or lower alkyl, and X is halogen, trifluoromethyl, lower alkyl, lower alkoxy and nitro, said X substituent being located in the benzenoid moiety thereof.

In one of its process aspects the instant invention may be described as polyfluoroalkylating either a 2-oxo-$3R_2R_3$-$5R_4$-1,3-dihydro-2H-1,4-benzodiazepine or a 2-oxo-$3R_5R_6$-$5R_4$-1,3-dihydro-2H-1,4-benzodiazepine-4-oxide.

In another of its process aspects this invention may be described as N-polyfluoroalkylating either a 2-aminobenzophenone, a 2-aminobenzoylpyridine or other 2-aminobenzoylheterocycle intermediate and converting said polyfluoroalkylated product obtained therefrom to the desired 2 - oxo - $3R_2R_3$-$5R_4$-1,3-dihydro-2H-1,4-benzodiazepine-2-one and the 4-oxides thereof.

In another of its process aspects, this invention may be described as residing in the concept of administering a tangible embodiment of this invention so as to elicit an effect upon a mammalian central nervous system and by so doing render such tangible embodiments useful as muscle relaxants, sedatives, anti-convulsants and anti-anxiety agents.

DESCRIPTION OF THE PREFERRED EMBODIMENTS AND PROCESSES

The tangible embodiments of the composition aspect of this invention may be further described as those chemical compounds of the structural formulae:

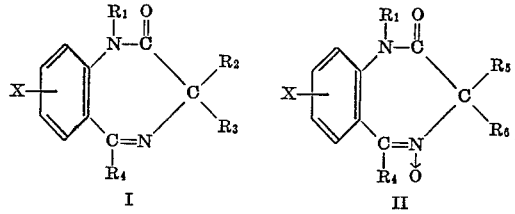

wherein X is a member of the group consisting of hydrogen, halogen, trifluoromethyl, nitro, lower alkyl, and lower alkoxy, $R_1$ is polyfluoroalkyl, $R_2$ is a member of the group consisting of hydrogen, lower alkyl, hydroxy, and lower alkanoyloxy, $R_3$ is a member of the group consisting of hydrogen and lower alkyl with the proviso that when $R_2$ is hydroxy or lower alkanoyloxy, $R_3$ is hydrogen, $R_4$ is a member of the group consisting of phenyl, X-substituted phenyl and a heterocycle, said heterocycle being selected from the group consisting of pyridyl, pyrimidyl, pyridazinyl, pyrazinyl, thienyl, furyl, thiazoyl, and oxazoyl, and $R_5$ and $R_6$ are members of the group consisting of hydrogen and lower alkyl, and when $R_4$ is a heterocycle, the acid addition salts thereof.

As used herein, the term "lower alkyl" refers to both straight and branched-chain hydrocarbon radicals having up to six carbon atoms such as methyl, ethyl, propyl, isopropyl, n-butyl, t-butyl, and the like. The term "halogen" comprehends all four halogens, preferably chloro and bromo. The term "polyfluoroalkyl" refers to lower alkyl radicals substituted with more than one fluoro radical and preferably includes such moieties as 2,2,2-trifluoroethyl, $CF_3$ and 2,2,3,3,3-pentafluoropropyl and the like. "Lower alkoxy" includes ether radicals wherein the lower alkyl moiety is as defined for "lower alkyl" above such as for example, methoxy, ethoxy, propoxy and the like. "Lower alkanoyloxy" includes those esters containing the acyl radicals of alkanoic acids including such radicals as formyl, acetyl, propionyl, butyryl, valeryl, hexanoyl and the branched-chain isomers thereof. When applicable, (e.g. when $R_4$ is a heterocycle) the therapeutically acceptable acid addition salts include those formed with both inorganic and organic acids such as hydrochloric acid, hydrobromic acid, nitric acid, sulfuric acid, acetic acid, formic acid, succinic acid, maleic acid, p-toluenesulonic acid and the like. The 5-position heterocyclic radical most preferably includes the 2-, 3-, and 4-pyridyl radicals but may also include the 2- and 4-pyrimidyl radicals, the 3- and 4-pyridazinyl radicals, the 2-pyrazinyl radical, the 2- and 3-thienyl radicals, the 2- and 3-furyl radicals, the 2-, 4- and 5-thiazoyl radicals, and the 2-, 4- and 5-oxazoyl radicals.

In general, the N-polyfluoroalkyl-2-oxo-5R$_4$-1,3-2H-1,4-benzodiazepines of Formula I may be prepared by polyfluoroalkylating the appropriate 2-oxo-5R$_4$-1,3-dihydro-2H-1,4-benzodiazepine. Alternatively, they may be prepared by synthesizing the appropriately substituted benzodiazepine from intermediates already bearing the polyfluoroalkyl radicals.

When it is desired to prepare the N-polyfluroalkylated-2-oxo-5-R$_4$-1,3 - dihydro-2H-1,4-benzodiazepines from 2-oxo - 5 - R$_4$ - 1,3-dihydro-2H-1,4-benzodiazepines several polyfluroalkylation procedures may be utilized. In a preferred instance the benzodiazepine is subjected to alkylation with a sulfonate ester of polyfluoroalkanol of the general formula R$_1$OSO$_2$Z, wherein R$_1$ is polyfluoroalkyl (preferably trifluoroethyl) and Z is a member of the group consisting of alkyl, aryl, aralkyl and polyhaloalkyl. Exemplary of such sulfonate esters are 2,2,2-trifluoroethyl methyl sulfonate, 2,2,2-trifluoroethyl benzyl sulfonate, 2,2,2-trifluoroethyl trichloromethyl sulfonate and 2,2,3,3,3-pentafluoropropyl methyl sulfonate and the like. In effecting this alkylation reaction, the reactants are generally heated together in an anhydrous solvent system at temperatures up to 100° in the presence of bases such as sodium hydride, sodium amide, sodium methoxide, potassium t-butoxide and the like. Suitable anhydrous solvents useful for this reaction are dimethylformamide, dimethylacetamide, diphenyl ether, diglime, tetralin and the like. Alternatively, the appropriately substituted benzodiazepine starting materials may be alkylated with a polyfluoroalkyl halide such as 2,2,2-trifluoroethyl halide and 2,2,3,3,3-pentafluoropropyl halide, said halides having an atomic weight greater than 19, preferably iodine. The latter polyfluoroalkylation reaction is effected in non-reactive organic solvents such as dimethylformamide or aromatic hydrocarbons like benzene, toluene or xylene in the presence of a basic condensing agent according to standard techniques. Exemplary of basic condensing agents are sodium methoxide, sodium hydride, potassium t-butoxide, sodium amide, and the like. The reaction is usually conducted at temperatures in the range of from about 20 to about 110° C. preferably around 65° C. and for a period of time ranging from 1 to 24 hours, preferably about 7 hours, followed by the further addition of polyfluoroalkyl halide and further reaction for approximately 16 hours. The polyfluoroalkylated benzodiazepine products are isolated by filtration of the insoluble salts, evaporation of the filtrate, further isolated by selective solvent extraction techniques, and purified by chromatographic techniques such as by elution from an alumina adsorption column.

The foregoing reaction may be schematically depicted as follows:

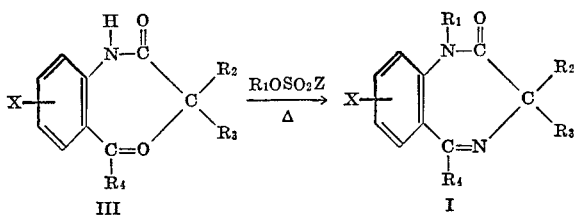

wherein X, R$_1$, R$_2$, R$_3$, R$_5$ and Z are as previously defined.

The benzodiazepine starting compounds III and the precursors therefore, for making the compounds of Formula I via the polyfluoroalkylation of benzodiazepines are prepared by method analogous to those described in the literature such as J. Org. Chem. 27 562ff and 3181ff.

The 2-aminobenzophenone precursors are preparable by well described methods, the choice of method being dependent on the position and kind of substituents desired on the aromatic rings. A most general method utilizing a substituted anthranilic acid (IV) is that described in J. Org. Chem. 27, 3181, wherein an anthranilic acid (IV) by reaction with acetic anhydride forms a benzoxazinone (V), which, upon reaction with the appropriate Grignard reagent, followed by hydrolysis yields the desired 2-aminobenzophenone. This sequence of reactions may be depicted as follows:

Reaction Scheme A

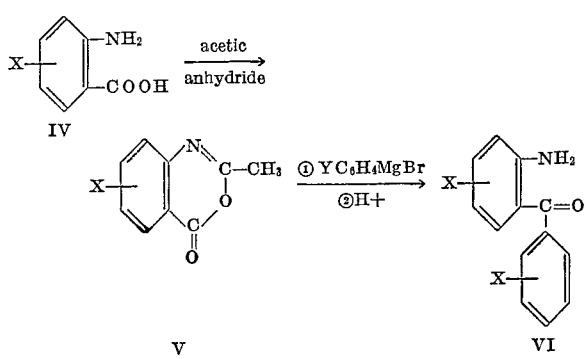

X as being previously defined.

Exemplary of another suitable method for preparing 2-aminobenzophenones, is that which involves the condensation of an X-substituted aniline (VII) with benzoyl chloride (VIII) under Friedel-Crafts reaction conditions and rigorously hydrolyzing the primary reaction product yielding the desired 2-aminobenzophenone (VI).

Reaction Scheme B

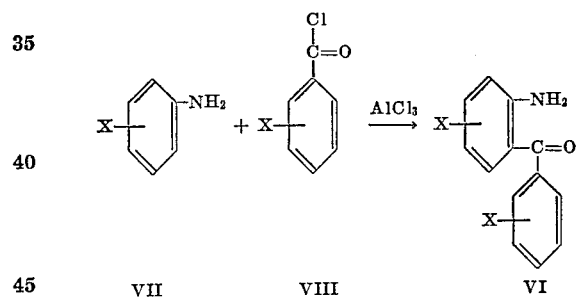

X being as previously defined.

The appropriate X-substituted (2-aminobenzoyl) pyridine or the equivalent (2 - aminobenzoyl) pyrimidines, (2-aminobenzoyl) pyridazines, (2-aminobenzoyl) pyrazines, (2-aminobenzoyl) thiophene, (2-aminobenzoyl) furan, (2-aminobenzoyl) thiazole, and (2-aminobenzoyl) oxazole precursors are also prepared by analogous methods well-known to those of ordinary skill in the art, such as that described and those referenced in J. Pharm. Sciences, 53, 264 (1946). A preferred method utilizes the oxidative fission of the appropriate X-substituted 2-phenyl-3-(pyridyl) indole, such as with chromium trioxide according to standard techniques, followed by hydrolysis of the so-formed (2-benzamido-X-substituted benzoyl) pyridine. This sequence of reactions may be schematically depicted as follows:

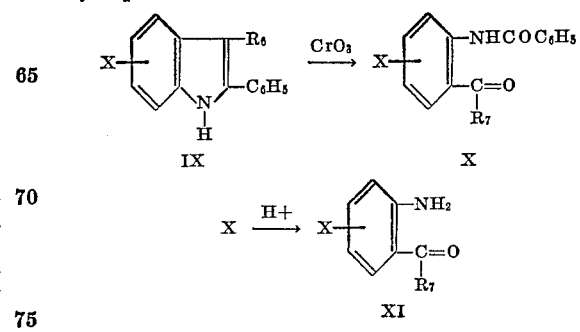

wherein $R_7$ represents 2-, 3- and 4-pyridyl, 2- and 4-pyrimidyl, 3- and 4-pyridazinyl, 2-pyrazinyl, 2- and 3-thienyl, 2- and 3-furyl, 2-, 4- and 5-thiazoyl, and 2-, 4- and 5-oxazoyl, and X is as previously defined.

It is evident that the position para to the amino group (of Formulae VI and XI) corresponds to the 7-position in the final product; a substituent meta to the amino group will appear in the 6- or 8-position of the final product while an ortho substituent will appear in the 9-position of the final product. In those instances wherein a mixture of 6- and 8-position isomers are formed such compounds may easily be separated by the usual and standard techniques, e.g. chromatography.

The cyclization of the 2-aminobenzophenones (VI) and the 2-aminobenzopyridines or equivalently functioning (2-aminobenzyl) heterocyclics (XI) to give rise to the X-substituted-2-oxo-5$R_4$-1,3-dihydro-2H-1,4 - benzodiazepines (III) is effected by any number of methods well known in the art. For example, condensation of a 2-aminobenzophenone VI with a glycine ethyl ester hydrochloride, preferably in the presence of pyridine solvent and with heat gives rise to the cyclized starting material III. The general reaction sequence is depicted as follows:

Reaction Scheme C

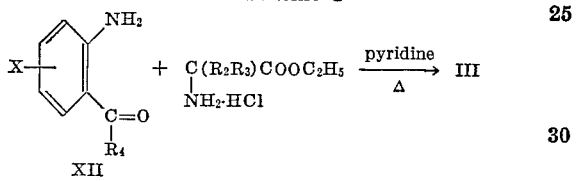

Alternatively, a glycyclamidobenzophenone or a glycylamidobenzoyl pyridine (or other heterocyclic equivalent of pyridine) may be prepared and subsequently cyclized by heating in a non-reactive solvent such as pyridine. The glycylamidobenzophenone and the glycylamidobenzoyl pyridines (or other heterocyclic equivalents thereof) are obtained by acylating the appropriate 2-aminobenzophenone or 2-aminobenzoyl pyridine (XI), respectively, with a glycyl hydrochloride or a haloacetyl halide. In the instance wherein the 2-aminobenzophenones, as well as those other intermediates embraced by Formula XII, is acylated with a haloacetylhalide (e.g. bromoacetyl bromide) the intermediate obtained therefrom (XIII) is treated with ammonia, which, as in the case of the product obtained by reacting a glycylchloride hydrochloride with the aminobenzophenone, will cyclize in situ under the reaction conditions producing the glycylamidobenzophenone. If desired, the acylating reagents may bear protecting groups which, upon hydrolysis, will be split off to form the desired glycylamidobenzophenone. These alternative methods for producing the benzodiazepine (III) may be depicted as follows, bearing in mind that although the specific carbobenzoxy and phthalamido protective groups are shown, it is to be understood that other equivalently functioning protective groups may similarly be used.

Reaction Scheme D

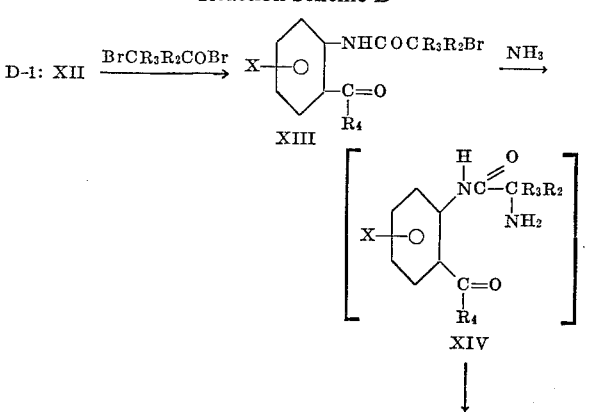

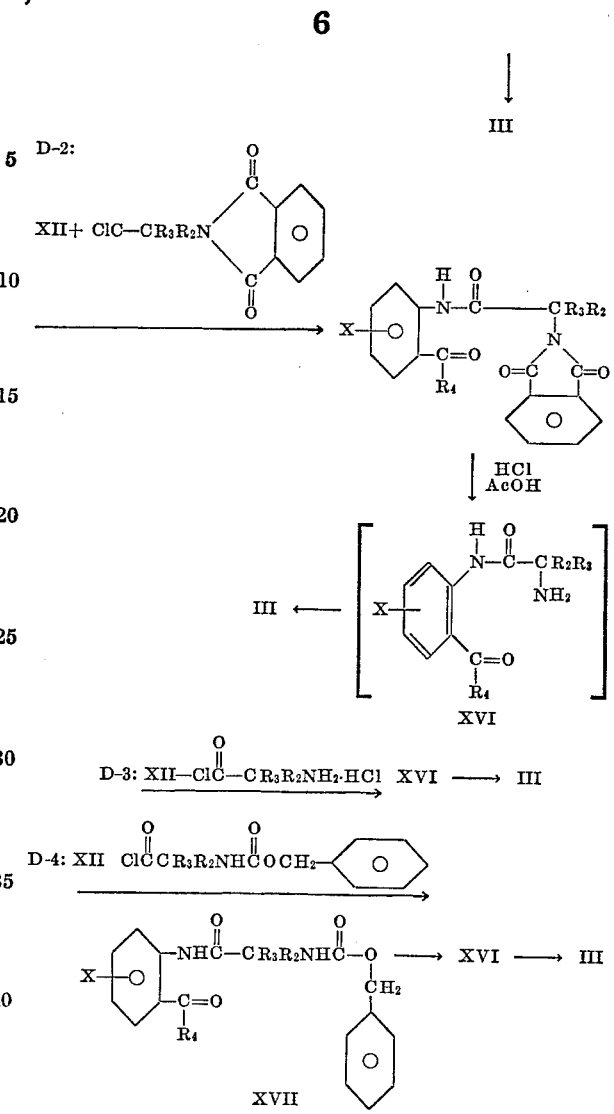

When it is desired to prepare the polyfluoroalkylated-2-oxo-5$R_4$-1,3-dihydro-2H - 1,4 - benzodiazepines of Formula I from intermediates already bearing the polyfluoroalkyl radicals, several routes of synthesis are applicable depending upon the ready availability of the starting materials. In general however, the several routes of synthesis ultimately employ an appropriately X-substituted 2-(N-polyfluoroalkylamine) benzophenone, or 2-(N-polyfluoroalkylaminobenzoyl) pyridine (or other equivalent thereof) which, by acylation and cyclization steps described for Reactions Schemes C and D, form the desired compounds of Formula I. For example, a 2-(2,2,2-trifluoroethylamine)-benzophenone may be acylated with bromoacetyl bromide to yield the corresponding 2-[N-(2,2,2-trifluoroethyl) - α - bromoacetamido] - benzophenone, which upon treatment with ammonia yields the corresponding 2-[N-(2,2,2-trifluoroethyl) - α - aminoacetamide] - benzophenone, which compound simultaneously undergoes cyclization under the conditions of amination.

The preparation of the key 2-(N-polyfluoroalkylamino) benzophenones or the 2-(polyfluoroalkylaminobenzoyl) pyridines (and other heterocyclic equivalents thereof) intermediates (XVIII) may readily be accomplished by any one of several techniques. Exemplary of such techniques is the above-described alkylation with a polyfluoroalkyl halide, and alkylation with a sulfonate ester of polyfluoroalkanols of the Formula $ROSO_2Z$ (as previously defined). In effecting this alkylation the reactants are heated together in an anhydrous solvent system at reflux temperatures in the presence of inorganic bases such as potassium carbonate. Suitable anhydrous solvents are diphenyl ether, diglime, tetralin and the like. In addition to the foregoing, the appropriate aminobenzophenones and aminobenzoyl heterocyclics may be first tosylated, whereupon the tosyl derivative will be subjected to polyfluoroalkylation techniques and the resulting product hydrolyzed to form the desired intermediates of Formula XVIII.

Of course, other variations may be applied to prepare the desired polyfluoroalkylated intermediates but such variations are to be recognized as equivalents of the above-described processes. For example, instead of trifluoroethylating a 2-aminobenzophenone it is feasible to apply the various trifluoroethylation techniques to compounds which, once they are trifluoroethylated are convertible to the desired 2-(2,2,2-trifluoroethylamine)-benzophenones. The conversion to the desired intermediates useful in the preparation of the compounds of Formula I may be structurally depicted as follows:

Reaction Scheme E

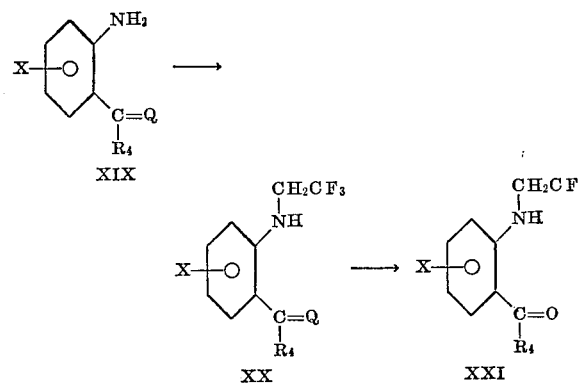

wherein Q is a moiety convertible to the desired carbonyl function such as (H,H), (H,OH) ketals and cyclic ketals. The conversion to the carbonyl function may be accomplished by techniques well known in the art.

It is, of course, also possible to form the desired 2-(2,2,2-trifluoroethylamino) benzophenone by conducting a Friedel-Crafts type reaction upon the appropriate X-substituted N-(2,2,2-trifluoroethyl) aniline, said trifluoroethylated aniline being prepared from the appropriate X-substituted aniline by any one of the above described trifluoroethylation techniques. Alternatively, the N-polyfluoroalkylaniline intermediates may be reacted with bromoacetyl bromide to yield the appropriate X-substituted-N-(α-bromo acetamide)-N-polyfluoroalkyl) aniline, which when reacted with an X-substituted benzoyl halide under Friedel-Crafts reaction conditions produces the previously described 2[(N-polyfluoroalkyl)-α-bromoacetamide] benzophenones. Such reactions may be depicted as follows:

Reaction Scheme F

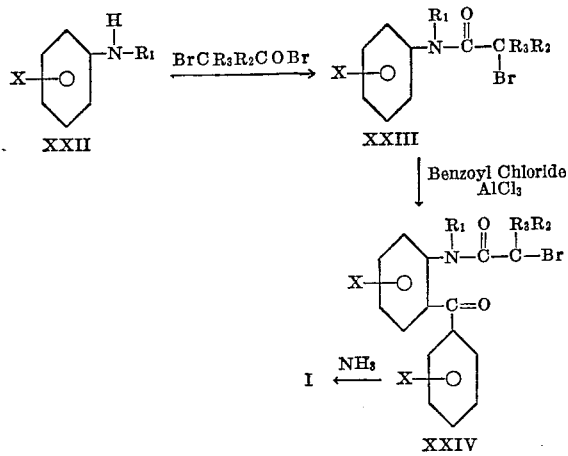

By subjecting the polyfluoroalkylated product (I) to the action of a peroxy acid like peracetic acid, compounds of Formula II are prepared. Alternatively, the intermediate, III, can be N-oxidized and then polyfluoroalkylated as described above.

To prepare tangible embodiments of Formula II wherein $R_1$ or $R_2$ is hydroxy or lower alkanoyloxy the N-oxide of Formula II is heated with acetic anhydride. In this reaction, $R_3$ and $R_4$ must be hydrogen. The acetate (XVI) so obtained is hydrolyzed to the hydroxy compound (XXVIII) via titration with alkali. This transformation is depicted as follows:

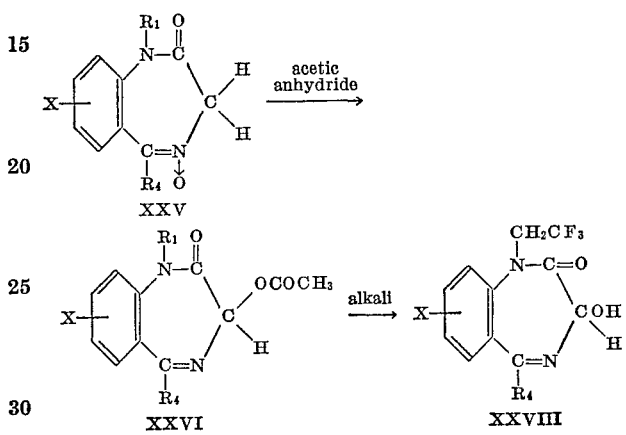

The hydroxyl group thus introduced is amenable to acylation in the usual manner to produce other lower alkanoyloxy derivatives such as with acid chlorides or anhydrides of propionic acid, butyric acid, valeric acid and the like.

The preferred method of synthesis when the polyfluoroalkyl group is trifluoromethyl is as follows:

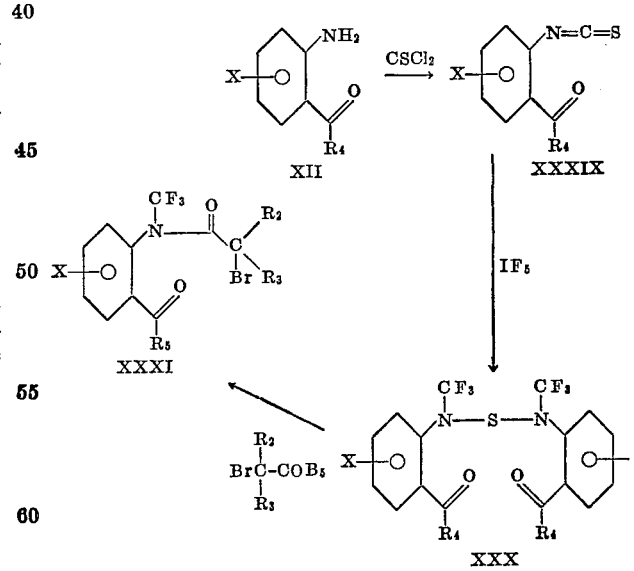

The 2-aminobenzophenone (XII) is treated with thiophosgene to give the corresponding isothiocyanate (XXIX) which is then allowed to react with iodine pentafluoride to give the bis(N-trifluoromethylamino)sulfide (XXX). Reaction of XXX with the bromoacetyl bromide or an $R_2$ and $R_3$ substituted equivalent thereof, gives the required intermediate (XXXI). The formation of the desired compounds from compounds of Formula XXXI is effected as described above for compounds of Formula XXIV.

The tangible embodiments of this invention exert an effect on the central nervous system as determined by standard pharmacological evaluation and as such are useful as tranquilizer or anti-anxiety agents. In addition the novel compounds exhibit valuable anti-convulsant and muscle relaxant properties. In pharmacological testing there has been observed significant differentials between a tranquilizing dose and one which causes neurological impairment. The therapeutic ratio (ratio of effective dose required to produce a tranquilizing effect) is significantly higher in the tangible embodiments than that observed in analogous compounds presently known in the art. In particular, 7 - chloro - 1,3 - dihydro - 5 - phenyl-1(2,2,2,-trifluoroethyl)-2H - 1,4 - benzodiazepine -2 - one has a therapeutic ratio of about 13 which indicates that the neurological impairment dose is about 13 times greater than that dose required to produce a tranquilizing effect according to accepted pharmacological testing methods. By way of further advantage, it has been found that test animals do not develop a tolerance to the tangible embodiments on repeated treatment in anti-convulsant evaluation.

The tangible embodiments of this invention are preferably administered via the oral route and for such are compounded into pharmaceutical dosage forms such as tablets, capsules, elixirs, solutions and the like. In the compounding, a dosage unit may contain the usual excipients like starches, gums and alcohol bases commonly employed. In addition, the tangible embodiments may be incorporated into a dosage unit together with another active therapeutic agent.

Based upon standard laboratory investigative procedures such as the Antagonism of Pentylene Tetrazole, Everett and Richards, J. Pharm. and Exp. Ther., vol. 81, p. 402 (1944) and Antagonism of Maximal Electro Shock-Induced Seizures in Mice, Synward, E. A. et al., J. Pharm. and Exp. Ther., vol. 106, p. 319 (1952) for anti-convulsant activity, the Central Nervous System Activity and Acute Toxicity, Irwin, Science 136, p. 123 (1962) for muscle relaxant and sedative-hypnotic activities, and Antagonism of Foot-Shock Induced Fighting in Mice, Tedeschi, et al., J. Pharm. and Exp. Ther., vol. 125, p. 28 (1959) and Taming Activity in Monkeys, Randall, Diseases of the Nervous System, vol. 21, p. 7 (1960) for anti-anxiety activity, it is found that when used as an anti-anxiety agent the dosage range is about 0.1–5 mg./kg. of body weight per day, preferably administered orally in divided dosages. When used as an anti-convulsant the dosage range is about 2–30 mg./kg. of body weight per day, preferably orally administered in divided doses. When used as a muscle relaxant the dosage range is about 0.1–1.5 mg./kg. of body weight per day, preferably orally administered in divided doses. When used as a sedative-hypnotic the dosage range is about 3–10 mg./kg. of body weight preferably orally administered in a single dose. Particularly desirable therapeutically effective compounds are:

7-chloro-1,3-dihydro-5-phenyl-1(2,2,2-trifluoroethyl)-2H-1,4-benzodiazepine-2-one;
7-nitro-1,3-dihydro-5-phenyl-1(2,2,2-trifluoroethyl)-2H-1,4-benzodiazepine-2-one;
7-bromo-1,3-dihydro-5-phenyl-1(2,2,2-trifluoroethyl)-2H-1,4-benzodiazepine-2-one;
7-chloro-1,3-dihydro-5(2-pyridyl)-1(2,2,2-trifluoroethyl)-2H-1,4-benzodiazepine-2-one;
7-nitro-1,3-dihydro-5(2-pyridyl)-1(2,2,2-trifluoroethyl)-2H-1,4-benzodiazepine-2-one;
7-bromo-1,3-dihydro-5(2-pyridyl)-1(2,2,2-trifluoroethyl)-2H-1,4-benzodiazepine-2-one;
7-chloro-1,3-dihydro-5(4-pyridyl)-1(2,2,2-trifluoroethyl)-2H-1,4-benzodiazepine-2-one;
7-bromo-1,3-dihydro-5(4-pyridyl)-1(2,2,-trifluoroethyl)-2H-1,4-benzodiazepine-2-one; and
7-nitro-1,3-dihydro-5(4-pyridyl)-1(2,2,2-trifluoroethyl)-2H-1,4-benzodiazepine-2-one.

Tablet Formulations (I) Formula and method of manufacture for 7-chloro-1,3 - dihydro - 5 - phenyl - 1(2,2,2-trifluoroethyl)-2H-1,4-benzodiazepine-2-one,

| Enteric coated tablets: | Mg./core |
|---|---|
| 7-chloro - 1,3 - dihydro - 5 - phenyl-1(2,2,2-trifluoroethyl) - 2H - 1,4 - benzodiazepine-2-one, micronized | 100.0 |
| Citric acid | 1.0 |
| Lactose, USP | 33.5 |
| Dicalcium phosphate | 70.0 |
| Pluronic F–68 | 30.0 |
| Sodium lauryl sulfate | 15.0 |
| Polyvinylpyrrolidone | 15.0 |
| Carbowax 1500 | 4.5 |
| Carbowax 6000 | 45.0 |
| 3A alcohol 50 ml./1000 cores. | |
| Corn starch | 30.0 |
| Dry: | |
| Sodium lauryl sulfate | 3.0 |
| Magnesium stearate | 3.0 |
| Tablet weight | 350.0 |

Procedure: The 7 - chloro - 1,3 - dihydro - 5 - phenyl-1(2,2,2-trifluoroethyl) - 2H - 1,4 - benzodiazepine-2-one is mixed with the citric acid, lactose, dicalcium phosphate, pluronic and sodium lauryl sulfate. The above mixture is screen through a No. 60 screen and granulated with an alcoholic solution consisting of polyvinylpyrrolidone, Carbowax 1500 and 6000. Add additional alcohol, if necessary, to bring powders to a pasty mass. Add corn starch and continue mixing until uniform granules are formed. Pass through a No. 10 screen, tray and dry in oven at 100° C. for 12–14 hours. Reduce dried granulation through a No. 16 screen add sodium lauryl sulfate and magnesium sulfate, mix and compress into desired shape on a tablet machine.

Pluronic F–68 is a U.S. registered trademark for a nonionic surface-active agent prepared by the addition of ethylene oxide to a polypropylene glycol which has a molecular weight of 1750.

Coating: The above cores are treated with a lacquer and dusted with talc to prevent moisture adsorption. Subcoat layers are added to round out the core. A sufficient number of lacquer coats are applied to make the core enteric. Additional sub-coats and smoothing coats are applied to completely round out and smooth the tablet. Color coats are applied until desired shade is obtained. After drying the coated tablets are polished to give the tablets an even gloss.

(II) Capsule formulations—

| Formula: | Mg./capsule |
|---|---|
| 7-chloro-1,3-dihydro-5-phenyl - 1 - (2,2,2 - trifluoroethyl)-2H-1,4-benzodiazepine - 2 - one, micronized | 100.00 |
| Citric acid | 1.00 |
| Pluronic, F–68 | 40.00 |
| Sodium lauryl sulfate | 20.00 |
| Lactose | 238.00 |
| Magnesium stearate | 101.00 |
| | 400.00 |

Procedure: Mix together 7-chloro-1,3-dihydro-5-phenyl-1-(2,2,2-trifluoroethyl)-2H-1,4-benzodiazepine-2 - one, citric acid, pluronic, sodium lauryl sulfate and lactose. Pass through a No. 80 screen. Add magnesium stearate, mix and encapsulate into the proper size 2 piece gelatin capsule.

(III) Oral suspension—

Formula: mg./5 ml.
7-chloro-1,3-dihydro-5-phenyl - 1 - (2,2,2 - trifluoroethyl)-2H-1,4-benzodiazepine - 2 - one, micronized _____ 100.0
Veegum, vanderbilt _____ 50.0
Standard granulated sugar, USP _____ 2500.0
Sorbitol solution, USP _____ 1250.0
Sodium saccharin, NF _____ 50.0
Sodium benzoate, USP _____ 5.0
Ethanol, USP _____ml__ 0.025
Menthol, USP _____ 1.000
Flavor q.s.
Purified water, USP, to make 5 ml.

Method of preparation: Dissolve the sodium saccharin, sodium benzoate, standard granulated sugar and sorbitol solution in approximately 80% of the required amount of water. Disperse the Veegum in approximately 5% of the required amount of water and add the dispersion to the previously prepared syrup. Prepare a slurry of the 7-chloro-1,3-dihydro-5-phenyl-1-(2,2,2-trifluoroethyl) - 2H-1,4-benzodiazepine-2-one with aproximately 10 % of the required amount of water and pass through a suitable colloid mill until free of grittiness. Add the milled active slurry to the batch. Dissolve the menthol and flavor in the alcohol and add the resulting solution to the batch. Add sufficient purified water to bring the batch to total volume. Agitate until uniform.

(IV) Suppository—

Formula: Mg./2 mgs.
7-chloro-1,3-dihydro-5-phenyl-1-(2,2,2 - trifluoroethyl)-2H-1,4-benzodiazepine - 2 - one, micronized _____ 100
Theobroma oil, pharm. grade to make 2 gms.

Method of preparation: Prepare a slurry of the 7-chloro-1,3-dihydro-5-phenyl-1-(2,2,2-trifluoroethyl)-2H - 1,4-benzodiazepine-2-one with a portion of the melted theobroma oil and pass the slurry through a suitable colloid mill until it is free of grittiness. Add sufficient melted theobroma oil to bring the batch to final weight. Pour the melted mix, while maintaining uniformity, into appropriately prepared molds and allow to cool.

The following examples are illustrative of the preparation of representations of the tangible embodiments of this invention:

Example 1.—7-choro-1,3-dihydro-5-phenyl-1-(2,2,2-trifluoroethyl)-2H-1,4-benzodiazepine-2-one Prepare a solution of sodium methylate by dissolving 3.9 grams of sodium metal in 500 ml. of methanol. Add 39.0 grams of 7-chloro-1,3-dihydro-5-phenyl-2H-1,4-benzodiazepine-2-one. Evaporate the reaction mixture to a residue and dissolve the residue in 170 ml. of dimethylformamide. Add 30 grams of 2,2,2-trifluoroethyl iodide and stir at room temperature for ½ hour, then heat to 60°–70° C. for an additional 7 hours. Add 19 grams of 2,2,2-trifluoroethyl iodide and resume the heating and stirring at 60°–70° C. for an additional 16 hours. Filter off the solids and evaporate the filtrate to a residue in vacuo. Triturate the residue with water and extract with ethyl ether. Wash the ethereal extract with water, dry over anhydrous sodium sulfate and evaporate the solvent to a residue. Extract the residue with ethyl ether and filter. Concentrate the ethereal extract to a residue. Dissolve the residue in benzene and chromatograph on 300 grams of alumina contained in a glass column 1.5 inches in diameter to give the crude product. Elute with benzene. Crystallize this product from acetone-petroleum ether to obtain the product of this example.

Alternatively, the compound of this example is prepared as follows: Heat 38.6 g. of 2′-benzoyl-5′-chloro-p-toluene-sulfonamide and 5.4 g. of sodium methoxide in 250 ml. of benzene for 1 hr. under reflux. Then add 42 g. of 2,2,2-trifluoroethyl iodide and reflux the reaction mixture with stirring for 12 hr. Cool, filter off the solids, evaporate the solvent, dissolve the residue in 100 ml. of concentrated sulfuric acid and heat the solution on the steam bath for 24 min. Cool the solution, pour ino 1 l. of water, make basic with ammonia and extract with chloroform. Wash the chloroform extracts with water, dry over anhydrous sodium sulfate and evaporate the chloroform to give 2-(2,2,2-trifluoroethyl)amino-5-chlorobenzophenone which is used in the next step.

Dissolve 29.5 grams of 2-(2,2,2-trifluoroethyl)amino-5-chlorobenzophenone obtained above and 21.0 grams of glycine ethyl ester hydrochloride in 200 ml. of pyridine. Heat the solution to reflux and maintain the reflux with stirring for 15 hours. During the first 4 hours remove approximately 50 ml. of solvent and replace with dry pyridine. Concentrate the solution in vacuo to a residue. Triturate the residue in water and extract with ether. Filter off any remaining solids and separate the solvent layers. Adjust the pH of the aqueous solution to 8.0–8.5 and re-extract with ether. Combine the ethereal extracts and wash them with water and dry them over anhydrous sodium sulfate. Chromatograph as described above.

As is apparent to one skilled in the art, by replacing the 7-chloro-1,3-dihydro-5-phenyl-2H-1,4-benzodiazepine-2-one of Example 1 with other appropriately substituted 1,4-benzodiazepines the production of other 1-(2,2,2-trifluoroethyl) analogs may be effected by following substantially the procedure described in Example 1 above. Exemplary of the substituted 1,4-benzodiazepines utilizable in the foregoing example are those set forth below:

8-bromo-1,3-dihydro-5-phenyl-2H-1,4-benzodiazepine-2-one
9-trifluoromethyl-1,3-dihydro-5-phenyl-2H-1,4-benzodiazepine-2-one
6-nitro-1,3-dihydro-5-phenyl-2H-1,4-benzodiazepine-2-one
7-methyl-1,3-dihydro-5-phenyl-2H-1,4-benzodiazepine-2-one
9-iodo-1,3-dihydro-5-phenyl-2H-1,4-benzodiazepine-2-one
8-propoxy-1,3-dihydro-5-phenyl-2H-1,4-benzodiazepine-2-one
6-butyl-1,3-dihydro-5-phenyl-2H-1,4-benzodiazepine-2-one
7-fluoro-1,3-dihydro-5-phenyl-2H-1,4-benzodiazepine-2-one
7-bromo-1,3-dihydro-5-phenyl-2H-1,4-benzodiazepine-2-one
8-trifluoromethyl-1,3-dihydro-5-phenyl-2H-1,4-benzodiazepine-2-one
7-methoxy-1,3-dihydro-5-phenyl-2H-1,4-benzodiazepine-2-one
9-ethoxy-1,3-dihydro-5-phenyl-2H-1,4-benzodiazepine-2-one
8-nitro-1,3-dihydro-5-phenyl-2H-1,4-benzodiazepine-2-one
1,3-dihydro-5(2-chlorphenyl)-2H-1,4-benzodiazepine-2-one
1,3-dihydro-5(3-nitrophenyl)-2H-1,4-benzodiazepine-2-one
1,3-dihydro-5(4-methoxyphenyl)-2H-1,4-benzodiazepine-2-one
1,3-dihydro-5(3-trifluoromethylphenyl)-2H-1,4-benzodiazepine-2-one
1,3-dihydro-5(2-bromophenyl)-2H-1,4-benzodiazepine-2-one
7-chloro-1,3-dihydro-5(2-chlorophenyl)-2H-1,4-benzodiazepine-2-one
9-nitro-1,3-dihydro-5(4-nitrophenyl)-2H-1,4-benzodiazepine-2-one
8-methyl-1,3-dihydro-5(3-methoxyphenyl)-2H-1,4-benzodiazepine-2-one
7-ethoxy-1,3-dihydro-5(3-bromophenyl)-2H-1,4-benzodiazepine-2-one 6-trifluoromethyl-1,3-dihydro-5(4-iodophenyl)-2H-1,4-benzodiazepine-2-one
9-butyl-1,3-dihydro-5(2-fluorophenyl)-2H-1,4-benzodiazepine-2-one
8-isopropoxy-1,3-dihydro-5(2-trifluoromethylphenyl)-2H-1,4-benzodiazepine-2-one
8-fluoro-1,3-dihydro-5(3-chlorophenyl)-2H-1,4-benzodiazepine-2-one
7-bromo-1,3-dihydro-5(4-ethoxyphenyl)-2H-1,4-benzodiazepine-2-one
9-methoxy-1,3-dihydro-5(4-nitrophenyl)-2H-1,4-benzodiazepine-2-one
9-ethyl-1,3-dihydro-5(3-iodophenyl)-2H-1,4-benzodiazepine-2-one
8-trifluoromethyl-1,3-dihydro-5-phenyl-2H-1,4-benzodiazepine-2-one
7-bromo-1,3-dihydro-5-phenyl-2H-1,4-benzodiazepine-2-one
9-nitro-1,3-dihydro-5-phenyl-2H-1,4-benzodiazepine-2-one
6-t-butyl-1,3-dihydro-5-phenyl-2H-1,4-benzodiazepine-2-one
7-isopropoxy-1,3-dihydro-5-phenyl-2H-1,4-benzodiazepine-2-one
8-iodo-1,3-dihydro-5-phenyl-2H-1,4-benzodiazepine-2-one
9-fluoro-1,3-dihydro-5-phenyl-2H-1,4-benzodiazepine-2-one
6-trifluoromethyl-1,3-dihydro-5-phenyl-2H-1,4-benzodiazepine-2-one
7-nitro-1,3-dihydro-5-phenyl-2H-1,4-benzodiazepine-2-one
7-chloro-1,3-dihydro-5-(2-pyridyl)-2H-1,4-benzodiazepine-2-one
7-chloro-1,3-dihydro-5-(3-pyridyl)-2H-1,4-benzodiazepine-2-one
7-chloro-1,3-dihydro-5-(4-pyridyl)-2H-1,4-benzodiazepine-2-one
7-bromo-1,3-dihydro-5-(2-pyridyl)-2H-1,4-benzodiazepine-2-one
7-bromo-1,3-dihydro-5-(3-pyridyl)-2H-1,4-benzodiazepine-2-one
7-bromo-1,3-dihydro-5-(4-pyridyl)-2H-1,4-benzodiazepine-2-one
7-nitro-1,3-dihydro-5-(2-pyridyl)-2H-1,4-benzodiazepine-2-one
7-nitro-1,3-dihydro-5-(3-pyridyl)-2H-1,4-benzodiazepine-2-one
7-nitro-1,3-dihydro-5-(4-pyridyl)-2H-1,4-benzodiazepine-2-one.

The compounds named above upon being treated with essentially the procedure of Example 1 above, yield the 1-(2,2,2-trifluoroethyl) products listed below:

8-bromo-1,3-dihydro-5-phenyl-1-(2,2,2-trifluoroethyl)-2H-1,4-benzodiazepine-2-one
9-trifluoromethyl-1,3-dihydro-5-phenyl-1-(2,2,2-trifluoroethyl)-2H-1,4-benzodiazepine-2-one
6-nitro-1,3-dihydro-5-phenyl-1-(2,2,2-trifluoroethyl)-2H-1,4-benzodiazepine-2-one
7-methyl-1,3-dihydro-5-phenyl-1-(2,2,2-trifluoroethyl)-2H-1,4-benzodiazepine-2-one
9-iodo-1,3-dihydro-5-phenyl-1-(2,2,2-trifluoroethyl)-2H-1,4-benzodiazepine-2-one
8-propoxy-1,3-dihydro-5-phenyl-1-(2,2,2-trifluoroethyl)-2H-1,4-benzodiazepine-2-one
6-butyl-1,3-dihydro-5-phenyl-1-(2,2,2-trifluoroethyl)-2H-1,4-benzodiazepine-2-one
7-fluoro-1,3-dihydro-5-phenyl-1-(2,2,2-trifluoroethyl)-2H-1,4-benzodiazepine-2-one
7-bromo-1,3-dihydro-5-phenyl-1-(2,2,2-trifluoroethyl)-2H-1,4-benzodiazepine-2-one
8-trifluoromethyl-1,3-dihydro-5-phenyl-1-(2,2,2-trifluoroethyl)-2H-1,4-benzodiazepine-2-one
7-methoxy-1,3-dihydro-5-phenyl-1-(2,2,2-trifluoroethyl)-2H-1,4-benzodiazepine-2-one
9-ethoxy-1,3-dihydro-5-phenyl-1-(2,2,2-trifluoroethyl)-2H-1,4-benzodiazepine-2-one
7-chloro-1,3-dihydro-5-(2-pyridyl)-1-(2,2,2-trifluoroethyl)-2H-1,4-benzodiazepine-2-one
7-chloro-1,3-dihydro-5-(3-pyridyl)-1-(2,2,2-trifluoroethyl)-2H-1,4-benzodiazepine-2-one
7-chloro-1,3-dihydro-5-(4-pyridyl)-1-(2,2,2-trifluoroethyl)-2H-1,4-benzodiazepine-2-one
7-bromo-1,3-dihydro-5-(2-pyridyl)-1-(2,2,2-trifluoroethyl)-2H-1,4-benzodiazepine-2-one
7-bromo-1,3-dihydro-5-(3-pyridyl)-1-(2,2,2-trifluoroethyl)-2H-1,4-benzodiazepine-2-one
7-bromo-1,3-dihydro-5-(4-pyridyl)-1-(2,2,2-trifluoroethyl)-2H-1,4-benzodiazepine-2-one
7-nitro-1,3-dihydro-5-(2-pyridyl)-1-(2,2,2-trifluoroethyl)-2H-1,4-benzodiazepine-2-one
7-nitro-1,3-dihydro-5-(3-pyridyl)-1-(2,2,2-trifluoroethyl)-2H-1,4-benzodiazepine-2-one
7-nitro-1,3-dihydro-5-(4-pyridyl)-1-(2,2,2-trifluoroethyl)-2H-1,4-benzodiazepine-2-one
8-nitro-1,3-dihydro-5-phenyl-1-(2,2,2-trifluoroethyl)-2N-1,4-benzodiazepine-2-one
1,3-dihydro-5-(2-chlorophenyl)-1-(2,2,2-trifluoroethyl)-2H-1,4-benzodiazepine-2-one
1,3-dihydro-5-(3-nitrophenyl)-1-(2,2,2-trifluoroethyl)-2H-1,4-benzodiazepine-2-one
1,3-dihydro-5-(4-methoxyphenyl)-1-(2,2,2-trifluoroethyl)-2H-1,4-benzodiazepine-2-one
1,3-dihydro-5-(3-trifluoromethylphenyl)-1-(2,2,2-trifluoroethyl)-2H-1,4-benzodiazepine-2-one
1,3-dihydro-5(2-bromophenyl)-1-(2,2,2-trifluoroethyl)-2H-1,4-benzodiazepine-2-one
7-chloro-1,3-dihydro-5(2-chlorophenyl)-1-(2,2,2-trifluoroethyl)-2H-1,4-benzodiazepine-2-one
9-nitro-1,3-dihydro-5(4-nitrophenyl)-1-(2,2,2-trifluoroethyl)-2H-1,4-benzodiazepine-2-one
8-methyl-1,3-dihydro-5(3-methoxyphenyl)-1-(2,2,2-trifluoroethyl)-2H-1,4-benzodiazepine-2-one
7-ethoxy-1,3-dihydro-5(3-bromophenyl)-1-(2,2,2-trifluoroethyl)-2H-1,4-benzodiazepine-2-one
6-trifluoromethyl-1,3-dihydro-5(4-iodophenyl)-1-(2,2,2-trifluoroethyl)-2H-1,4-benzodiazepine-2-one
9-butyl-1,3-dihydro-5(2-fluorophenyl)-1-(2,2,2-trifluoroethyl)-2H-1,4-benzodiazepine-2-one
8-isopropoxy-1,3-dihydro-5(2-trifluoromethylphenyl)-1-(2,2,2-trifluoroethyl)-2H-1,4-benzodiazepine-2-one
8-fluoro-1,3-dihydro-5(3-chlorophenyl)-1-(2,2,2-trifluoroethyl)-2H-1,4-benzodiazepine-2-one
7-bromo-1,3-dihydro-5-(4-ethoxyphenyl)-1-(2,2,2-trifluoroethyl)-2H-1,4-benzodiazepine-2-one
9-methoxy-1,3-dihydro-5(4-nitrophenyl)-1-(2,2,2-trifluoroethyl)-2H-1,4-benzodiazepine-2-one
9-ethyl-1,3-dihydro-5(3-iodophenyl)-1-(2,2,2-trifluoroethyl)-2H-1,4-benzodiazepine-2-one
8-trifluoromethyl-1,3-dihydro-5-phenyl-1-(2,2,2-trifluoroethyl)-2H-1,4-benzodiazepine-2-one
7-bromo-1,3-dihydro-5-phenyl-1-(2,2,2-trifluoroethyl)-2H-1,4-benzodiazepine-2-one
6-t-butyl-1,3-dihydro-5-phenyl-1-(2,2,2-trifluoroethyl)-2H-1,4-benzodiazepine-2-one
7-isopropoxy-1,3-dihydro-5-phenyl-1(2,2,2-trifluoroethyl)-2H-1,4-benzodiazepine-2-one
8-iodo-1,3-dihydro-5-phenyl-1-(2,2,2-trifluoroethyl)-2H-1,4-benzodiazepine-2-one
9-fluoro-1,3-dihydro-5-phenyl-1-(2,2,2-trifluoroethyl)-2H-1,4-benzodiazepine-2-one
6-trifluoromethyl-1,3-dihydro-5-phenyl-1-(2,2,2-trifluoroethyl)-2H-1,4-benzodiazepine-2-one
7-nitro-1,3-dihydro-5-phenyl-1-(2,2,2-trifluoroethyl)-2H-1,4-benzodiazepine-2-one.

Example 2.—7-chloro-1,3-dihydro-5-phenyl-1(2,2,2-trifluoroethyl)-2H-1,4-benzodiazepine-2-one-4-oxide (A) Dissolve 50.0 grams of 7-chloro-1,3-dihydro-5-phenyl-2H-1,4-benzodiazepine-2-one in 1250 ml. of acetic acid. Cool the solution slightly and with agitation add 50 ml. of 40% peracetic acid. Maintain this solution at room temperature for 24 hours and precipitate by the addition of 10 liters of water with agitation. Neutralize the suspension with sodium carbonate and filter. Wash the precipitate with water and crystallize 7-chloro-1,3-dihydro-5-phenyl - 2H - 1,4-benzodiazepine-2-one-4-oxide from alcohol for use in the next step.

(B) Prepare a solution of sodium methylate by dissolving 3.9 g. sodium metal in 500 ml. methanol. Add 39.8 g. of 7-chloro-1,3-dihydro-5-phenyl-2H-1,4-benzodiazepine-2-one-4-oxide, with stirring. Evaporate the methanol and dissolve the residue in 170 ml. dimethylformamide. Add 30 grams of 2,2,2-trifluoroethyl iodide and stir at room temperature for ½ hour. Heat the mixture to 60°–70° C. with stirring for 7 hours. Add 19 grams of 2,2,2-trifluoroethyl iodide and heat with stirring at 60°–70° C. for a further 16 hours. Filter off the insolubles and evaporate the filtrate to a residue in vacuo. Triturate the residue with water, extract with ether, wash the ethereal solution with water, dry the solution over anhydrous sodium sulfate and evaporate to a residue. Triturate the residue with ether and filter. Evaporate the ether to a residue, dissolve the residue in benzene and chromatograph on 300 grams of alumina contained in a glass column 1.5 inches in diameter. Elute with benzene to give the product. Crystallize this product from acetone-petroleum ether to give the purified product.

By subjecting the products enumerated after Example 1 to essentially the procedure of part A of this example, the corresponding 4-oxides are produced.

Example 3.—3-acetoxy-7-chloro-1,3-dihydro-5-phenyl-1(2,2,2-trifluoroethyl)-2H-1,4-benzodiazepine-2-one Suspend 10 grams of 7-chloro-1,3-dihydro-5-phenyl-1-(2,2,2-trifluoroethyl)-2H-1,4-benzodiazepine - 2 - one-4-oxide in 100 ml. of acetic anhydride. Heat the mixture on the steam bath for 30 minutes with agitation. Cool and collect the product by filtration. Crystallize from acetone-petroleum ether obtaining the product of this example.

This procedure being of substantially general applicability may be used to convert other 1,4-benzodiazepine-4-oxides to their respective 3-lower alkanoyloxy analogs. Exemplary of such 1,4-benzodiazepine-4-oxides are:

(1) 7-bromo-1,3-dihydro-5-phenyl-1-(2,2,2-trifluoroethyl)-2H-1,4-benzodiazepine-2-one-4-oxide
(2) 9-nitro-1,3-dihydro-5-phenyl-1-(2,2,2-trifluoroethyl)-2H-1,4-benzodiazepine-2-one-4-oxide
(3) 8-trifluoromethyl-1,3-dihydro-5-phenyl-1-(2,2,2-trifluoroethyl)-2H-1,4-benzodiazepine-2-one-4-oxide
(4) 6-ethoxy-1,3-dihydro-5-phenyl-1-(2,2,2-trifluoroethyl)-2H-1,4-benzodiazepine-2-one-4-oxide
(5) 7-isopropyl-1,3-dihydro-5-phenyl-1-(2,2,2-trifluoroethyl)-2H-1,4-benzodiazepine-2-one-4-oxide
(6) 9-iodo-1,3-dihydro-5-phenyl-1-(2,2,2-trifluoroethyl)-2H-1,4-benzodiazepine-2-one-4-oxide
(7) 8-chloro-1,3-dihydro-5-phenyl-1-(2,2,2-trifluoroethyl)-2H-1,4-benzodiazepine-2-one-4-oxide
(8) 8-fluoro-1,3-dihydro-5-phenyl-1-(2,2,2-trifluoroethyl)-2H-1,4-benzodiazepine-2-one-4-oxide
(9) 6-methyl-1,3-dihydro-5-phenyl-1-(2,2,2-trifluoroethyl)-2H-1,4-benzodiazepine-2-one-4-oxide
(10) 7-Nitro-1,3-dihydro-5-phenyl-1-(2,2,2-trifluoroethyl)-2H-1,4-benzodiazepine-2-one-4-oxide
(11) 6-Chloro-1,3-dihydro-5-phenyl-1-(2,2,2-trifluoroethyl)-2H-1,4-benzodiazepine-2-one-4-oxide
(12) 9-methoxy-1,3-dihydro-5-phenyl-1-(2,2,2-trifluoroethyl)-2H-1,4-benzodiazepine-2-one-4-oxide
(13) 7-chloro-1,3-dihydro-5-(2-chlorophenyl)-1-(2,2,2-trifluoroethyl)-2H-1,4-benzodiazepine-2-one-4-oxide
(14) 9-nitro-1,3-dihydro-5-(4-nitrophenyl)-1-(2,2,2-trifluoroethyl)-2H-1,4-benzodiazepine-2-one-4-oxide
(15) 8-methyl-1,3-dihydro-5-(3-methoxyphenyl)-1-(2,2,2-trifluoroethyl)-2H-1,4-benzodiaepine-2-one-4-oxide
(16) 7-ethoxy-1,3-dihydro-5-(3-bromophenyl)-1-(2,2,2-trifluoroethyl)-2H-1,4-benzodiazepine-2-one-4-oxide
(17) 6-trifluoromethyl-1,3-dihydro-5-(4-iodophenyl)-1-(2,2,2-trifluoroethyl)-2H-1,4-benzodiazepine-2-one-4-oxide
(18) 9-butyl-1,3-dihydro-5-(2-fluorophenyl)-1-(2,2,2-trifluoroethyl)-2H-1,4-benzodiazepine-2-one-4-oxide
(19) 8-isopropoxy-1,3-dihydro-5-(2-trifluoromethylphenyl)-1-(2,2,2-trifluoroethyl)-2H-1,4-benzodiazepine-2-one-4-oxide
(20) 8-fluoro-1,3-dihydro-5-(3-chlorophenyl)-1-(2,2,2-trifluoroethyl)-2H-1,4-benzodiazepine-2-one-4-oxide
(21) 7-bromo-1,3-dihydro-5-(4-ethoxyphenyl)-1-(2,2,2-trifluoroethyl)-2H-1,4-benzodiazepine-2-one-4-oxide
(22) 9-methoxy-1,3-dihydro-5-(4-nitrophenyl)-1-(2,2,2-trifluoroethyl)-2H-1,4-benzodiazepine-2-one-4-oxide
(23) 9-ethyl-1,3-dihydro-5-(3-iodophenyl)-1-(2,2,2-trifluoroethyl)-2H-1,4-benzodiazepine-2-one-4-oxide The foregoing list of compounds exemplify the starting materials to be used in the process of Example 3. When such compounds are treated with the requisite lower alkanoic anhydride under the conditions of this example, the following corresponding products are produced:

(1) 3-propionyloxy-7-bromo-1,3-dihydro-5-phenyl-1-(2,2,2-trifluoroethyl)-2H-1,4-benzodiazepine-2-one
(2) 3-butanoyloxy-9-nitro-1,3-dihydro-5-phenyl-1-(2,2,2-trifluoroethyl)-2H-1,4-benzodiazepine-2-one
(3) 3-valeroyloxy-8-trifluoromethyl-1,3-dihydro-5-phenyl-1-(2,2,2-trifluoroethyl)-2H-1,4-benzodiazepine-2-one
(4) 3-caproyloxy-6-ethoxy-1,3-dihydro-5-phenyl-1-(2,2,2-trifluoroethyl)-2H-1,4-benzodiazepine-2-one
(5) 3-acetoxy-7-isopropyl-1,3-dihydro-5-phenyl-1-(2,2,2-trifluoroethyl)-2H-1,4-benzodiazepine-2-one
(6) 3-valeroyloxy-9-iodo-1,3-dihydro-5-phenyl-1-(2,2,2-trifluoroethyl)-2H-1,4-benzodiazepine-2-one
(7) 3-acetoxy-8-chloro-1,3-dihydro-5-phenyl-1-(2,2,2-trifluoroethyl)-2H-1,4-benzodiazepine-2-one
(8) 3-propionyloxy-8-fluoro-1,3-dihydro-5-phenyl-1-(2,2,2-trifluoroethyl)-2H-1,4-benzodiazepine-2-one
(9) 3-caproyloxy-6-methyl-1,3-dihydro-5-phenyl-1-(2,2,2-trifluoroethyl)-2H-1,4-benzodiazepine-2-one
(10) 3-acetoxy-7-nitro-1,3-dihydro-5-phenyl-1-(2,2,2-trifluoroethyl)-2H-1,4-benzodiazepine-2-one
(11) 3-butanoyloxy-6-chloro-1,3-dihydro-5-phenyl-1-(2,2,2-trifluoroethyl)-2H-1,4-benzodiazepine-2-one
(12) 3-acetoxy-9-methoxy-1,3-dihydro-5-phenyl-1-(2,2,2-trifluoroethyl)-2H-1,4-benzodiazepine-2-one
(13) 3-propionyloxy-7-chloro-1,3-dihydro-5-(2-chlorophenyl)-1-(2,2,2-trifluoroethyl)-2H-1,4-benzodiazepine-2-one
(14) 3-caproyloxy-9-nitro-1,3-dihydro-5-(4-nitrophenyl)-1-(2,2,2-trifluoroethyl)-2H-1,4-benzodiazepine-2-one
(15) 3-butanoyloxy-8-methyl-1,3-dihydro-5-(3-methoxyphenyl)-1-(2,2,2-trifluoroethyl)-2H-1,4-benzodiazepine-2-one
(16) 3-acetoxy-7-ethoxy-1,3-dihydro-5-(3-bromophenyl)-1-(2,2,2-trifluoroethyl)-2H-1,4-benzodiazepine-2-one
(17) 3-valeryloxy-6-trifluoromethyl-1,3-dihydro-5-(4-iodophenyl)-1-(2,2,2-trifluoroethyl)-2H-1,4-benzodiazepine-2-one
(18) 3-acetoxy-9-butyl-1,3-dihydro-5-(2-fluorophenyl)-1-(2,2,2-trifluoroethyl)-2H-1,4-benzodiazepine-2-one
(19) 3-propionyloxy-8-isopropoxy-1,3-dihydro-5-(2-trifluoromethylphenyl)-1-(2,2,2-trifluoroethyl)-2H-1,4-benzodiazepine-2-one
(20) 3-valeryloxy-8-fluoro-1,3-dihydro-5-(3-chlorophenyl)-1-(2,2,2-trifluoroethyl)-2H-1,4-benzodiazepine-2-one
(21) 3-caproyloxy-7-bromo-1,3-dihydro-5-(4-ethoxyphenyl)-1-(2,2,2-trifluoroethyl)-2H-1,4-benzodiazepine-2-one

(22) 3-propionyloxy-9-methoxy-1,3-dihydro-5-(4-nitrophenyl)-1-(2,2,2-trifluoroethyl)-2H-1,4-benzodiazepine-2-one

(23) 3-butanoyloxy-9-ethyl-1,3-dihydro-5-(3-iodophenyl)-1-(2,2,2-trifluoroethyl)-2H-1,4-benzodiazepine-2-one, respectively.

Example 4.—7-chloro-1,3-dihydro-3-hydroxy-5-phenyl-1-(2,2,2-trifluoroethyl)-2H-1,4-benzodiazepine-2-one Suspend 5.0 grams of the product of Example 3 in 100 ml. of alcohol. Add one equivalent of a 5% sodium hydroxide solution while stirring. Dilute the reaction mixture with water until the product is fully precipitated. Collect the product by filtration, wash with water, air dry and recrystallize from hexane to yield the compound of this example.

Example 5.—3-propionyloxy-7-chloro - 1,3 - dihydro - 5- phenyl - 1 - (2,2,2 - trifluoroethyl) - 2H - 1,4 - benzodiazepine-2-one Suspend 3.7 grams of 7-chloro-1,3-dihydro-3-hydroxy-5 - phenyl-1-(2,2,2-trifluoroethyl)-2H-1,4-benzodiazepine-2-one in 25 ml. of benzene and add 1 ml. propionyl chloride. Heat the mixture to reflux and maintain for 2 hours. Cool the reaction mixture and dilute with hexane to incipient crystallization. Cool and filter obtaining the product of this example.

Example 6.—7 - chloro - 1,3 - dihydro - 3 - methyl - 5- phenyl - 1 - (2,2,2 - trifluoroethyl) - 2H - 1,4 - benzodiazepine-2-one Dissolve 23.2 grams of 2-amino-5-chloro-benzophenone in 200 ml. of pyridine. Add 22.9 grams alanine ethyl ester hydrochloride and bring the mixture to reflux. Slowly distill from the reaction mixture approximately 40 ml. of solvent. Reflux the mixture for a total of about 15 hours, then cool slightly and concentrate the mixture under reduced pressure to a residue. Add water to the residue and extract with ether. If there are insolubles present, filter the mixture and separate the solvent layers. Adjust the pH of the aqueous layer to 8.0–8.5 and extract with ether. Combine the ether layers, water wash and dry. Filter and concentrate the layers to a crystalline slurry. There is obtained 7-chloro-1,3-dihydro-3-methyl-5-phenyl-2H-1,4-benzodiazepine-2-one which is used in the next step.

Prepare a solution of sodium methylate by dissolving 1.0 grams of sodium metal in 125 ml. methanol. Add 9.8 g. of 7-chloro-1,3-dihydro-3-methyl-5-phenyl-2H-1,4-benzodiazepine-2-one and evaporate the solution to a residue. Dissolve the residue in 45 ml. of dimethylformamide. Add 8 g. of 2,2,2-trifluoroethyl iodide and stir at room temperature for ½ hour, then heat to 60°–70° C. for an additional 7 hours. Add 5 g. of 2,2,2-trifluoroethyl iodide and resume heating and stirring at 60°–70° C. for an additional 16 hours. Filter off the residue and proceed as in Example 1, obtaining the compound of this example.

Example 7.—1,3-dihydro-5-phenyl-1-(2,2,2-trifluoroethyl)-2H-1,4-benzodiazepine-2-one Prepare a solution of sodium methylate by dissolving 2.4 grams of sodium metal in 400 ml. of methanol. Add 23.6 g. of 1,3-dihydro-5-phenyl-2H-1,4-benzodiazepine-2-one and evaporate the reaction mixture to a residue. Dissolve the residue in 150 ml. of dimethylformamide and add 25.0 g. of 2,2,2-trifluoroethyl iodide to the mixture. Stir the mixture at room temperature for ½ hour, then heat to 60°–70° C. for an additional 7 hours. Add 15 g. of 2,2,2-trifluoroethyl iodide and resume the heating and stirring at 60°–70° C. for an additional 16 hours. Filter off the solids and evaporate the filtrate to a residue in vacuo. Triturate the residue with water and extract with ethyl ether. Wash the ethereal extract with water, dry over anhydrous sodium sulfate and evaporate the solvent to a residue. Extract the residue with ethyl ether and filter off the solids. Concentrate the ethereal extract to a residue and dissolve the residue in benzene and chromatograph on 300 g. of alumina as described in previous examples obtaining the compound of this example.

Example 8.—1,3-dihydro-5-phenyl-1-(2,2,2-trifluoroethyl)-2H-1,4-benzodiazepine-2-one-4-oxide Dissolve 5.0 g. of the product of Example 7 in 125 ml. of acetic acid. Cool the solution slightly and add 5.0 ml. of 40% peracetic acid. Maintain this solution at room temperature for 24 hours and precipitate the product by the addition of 1.0 filter of cold water followed by neutralization with sodium carbonate solution. Filter and wash the precipitate with water. Crystallize from alcohol obtaining the N-oxide of this example.

Example 9.—7-chloro-1-(2,2,2-trifluoroethyl)-5-phenyl-1,3-dihydro-2H-1,4-benzodiazepine-2-one (A) 2,2,2-trifluoroethyltrichloromethyl sulfonate.—Mix 120 gms. of trichloromethylsulfonyl chloride and 50 gms. of 2,2,2-trifluoroethanol in 150 ml. of water. Heat the mixture with stirring to 50° C. and add dropwise 44 gms. of 50% sodium hydroxide solution. Stir the reaction mixture for 2 hours at 40°–45° C. Separate the layers and wash the organic layer with dilute ammonium hydroxide solution followed by a water wash. Dry the washed organic layer over anhydrous sodium sulfate and distil to give 2,2,2-trifluoroethyl trichloromethyl sulfonate boiling at 84–86° C./20 mm. and having the following refractive index: $N_D^{24}$ 1.4275.

(B) 2 - (2,2,2-trifluoroethylamino)-5-chlorobenzophenone.—Mix with stirring 100 gms. of 2-amino-5-chlorobenzophenone and 61 gms. of 2,2,2-trifluoroethyl trichloromethyl sulfonate. Heat the mixture to 160° C. and hold with stirring at that temperature for 5 hours. Cool the reaction mixture to room temperature and add 2.0 liters of ethyl ether. Filter to remove the insoluble solid material and evaporate most of the ether. Add 500 ml. of benzene and re-filter the suspension. Concentrate the filtrate to give 80 gms. of an oily residue. Dissolve the residue in a minimum volume of a 2:1 hexane:benzene solvent mixture. Prepare a chromatographic column of 1000 gms. silica gel in a 2:1 hexane:benzene mixture and add the solution from above to the column. Elute the column with a 2:1 hexane:benzene mixture collecting 750 ml. fractions. Monitor the column by subjecting an aliquot of each fraction to infrared, thin layer chromatography and melting point determinations. Combine the appropriate eluates, evaporate them to a residue and crystallize the appropriate residue to yield 40.2 gms. of 2 - (2,2,2 - trifluoroethylamino) - 5 - chlorobenzophenone melting 99°–100° C.

By replacing the 2,2,2-trifluoromethyl sulfonate of this step with equivalent quantities of other sulfonate esters of 2,2,2-trifluoroethanol such as, 2,2,2-trifluoroethyl phenyl sulfonate, 2,2,2-trifluoroethyl tolyl sulfonate, 2,2,2-trifluoroethyl methyl sulfonate, 2,2,2-trifluoroethyl tribromomethyl sulfonate, 2,2,2-trifluoroethyl trifluoromethyl sulfonate, and by substantially following the foregoing procedure there is produced the desired 2-(2,2,2-trifluoroethylamino)-5-chlorobenzophenone.

Similarly, by replacing the 2-amino-5-chlorobenzophenone reactant of this step with equivalent quantities of 2-aminobenzophenone, 5-bromo-2-aminobenzophenone, 5-trifluoromethyl-2-aminobenzophenone, 5-methyl-2-aminobenzophenone, 5-methoxy-2-aminobenzophenone, 5-nitro-2-aminobenzophenone, 3-chloro-2-aminobenzophenone, 4-chloro-2-aminobenzophenone, 4-trifluoromethyl-2-aminobenzophenone, 6-chloro-2-aminobenzophenone, and by reacting said 2-aminobenzophenones with the sulfonate esters of 2,2,2-trifluoroethanol esters enumerated above and by following substantially the foregoing procedure there is produced, 2-(2,2,2-trifluoroethylamino) benzophenone
2-(2,2,2-trifluoroethylamino)-5-bromobenzophenone 2-(2,2,2-trifluoroethylamino)-5-trifluoro-
  methylbenzophenone
2-(2,2,2-trifluoroethylamino)-5-methylbenzophenone
2-(2,2,2-trifluoroethylamino)-5-methoxybenzophenone
2-(2,2,2-trifluoroethylamino)-5-nitrobenzophenone
2-(2,2,2-trifluoroethylamino)-3-chlorobenzophenone
2-(2,2,2-trifluoroethylamino)-4-chlorobenzophenone
2-(2,2,2-trifluoroethylamino)-4-trifluoro-
  methylbenzophenone
2-(2,2,2-trifluoroethylamino)-6-chlorobenzophenone,
  respectively.

(C.) 2-[N-(2,2,2 - trifluoroethyl)-α-bromoacetamido]-5-chlorobenzophenone.—Dissolve 40.0 gms. of the product of step B in 750 ml. of benzene and add 31 gms. of bromoacetyl bromide. Heat the mixture to reflux and hold there for 3 hours. Cool the benzene solution and wash 3 times with water totaling approximately 450 ml. Dry the benzene solution over anhydrous sodium sulfate and evaporate. Crystallize the residue from hexane to yield 52.1 gms. of 2-[N-(2,2,2-trifluoroethyl)-α-bromoacetamido]-5-chlorobenzophenone melting 115°–117° C.

By replacing the 2-(2,2,2-trifluoroethylamino)-5-chlorobenzophenone (product of step B) of this example with equivalent quantities of the benzophenones listed after step B above and by following substantially the procedure of this step there is produced, 2-[N-(2,2,2-trifluoroethyl)-2-bromoacetamido]-
  benzophenone
2-[N-(2,2,2-trifluoroethyl)-2-bromoacetamido]-
  5-brombenzophenone
2-[N-(2,2,2-trifluoroethyl)-2-bromoacetamido]-
  5-trifluoromethylbenzophenone
2-[N-(2,2,2-trifluoroethyl)-2-bromoacetamido]-
  5-methylbenzophenone
2-[N-(2,2,2-trifluoroethyl)-2-bromoacetamido]-
  5-methoxybenzophenone
2-[N-(2,2,2-trifluoroethyl)-2-bromoacetamido]-
  5-nitrobenzophenone
2-[N-(2,2,2-trifluoroethyl)-2-bromoacetamido]-
  3-chlorobenzophenone
2-[N-(2,2,2-trifluoroethyl)-2-bromoacetamido]-
  4-chlorobenzophenone
2-[N-(2,2,2-trifluoroethyl)-2-bromoacetamido]-
  4-trifluoromethylbenzophenone
2-[N-(2,2,2-trifluoroethyl)-2-bromoacetamido]-
  6-chlorobenzophenone, respectively.

(D) 7-chloro-1-(2,2,2-trifluoroethyl)-5-phenyl-1,3 - dihydro-2H-1,4 - benzodiazepine - 2-one.—Dissolve 52 gms. of the product of step C in 1.0 liter of chloroform and bubble ammonia gas through the solution at room temperature for 18 hours. Evaporate the chloroform under reduced pressure, wash the residue with water, extract the residue with ether and wash the ethereal solution with water. Dry the solution over anhydrous sodium sulfate and evaporate the solution to a residue. Crystallize the residue from an acetone-petroleum ether mixture to yield 30 gms. of 7-chloro-1-(2,2,2-trifluoroethyl)-5-phenyl-1,3-dihydro - 2H - 1,4-benzodiazepine - 2 - one melting 164°–166° C.

By replacing the 2-[N-2,2,2-trifluoroethyl)-2-bromoacetamido]-5-chlorobenzophenone of this step with equivalent quantities of the benzophenones listed in step C above, and by following substantially the procedure of this step there is produced, 1 - (2,2,2 - trifluoroethyl)-5-phenyl-1,3-dihydro-2H-1,4-benzodiazepine-2-one 7-bromo-1-(2,2,2-trifluoroethyl)-5-phenyl-1,3-dihydro-
  2H-1,4-benzodiazepine-2-one
7-trifluoromethyl-1-(2,2,2-trifluoroethyl)-5-phenyl-
  1,3-dihydro-2H-1,4-benzodiazepine-2-one
7-methyl-1-(2,2,2-trifluoroethyl)-5-phenyl-1,3-dihydro-
  2H-1,4-benzodiazepine-2-one
7-methoxy-1-(2,2,2-trifluoroethyl)-5-phenyl-1,3-dihydro-
  2H-1,4-benzodiazepine-2-one 7-nitro-1-(2,2,2-trifluoroethyl)-5-phenyl-1,3-dihydro-
  2H-1,4-benzodiazepine-2-one
9-chloro-1-(2,2,2-trifluoroethyl)-5-phenyl-1,3-dihydro-
  2H-1,4-benzodiazepine-2-one
8-chloro-1-(2,2,2-trifluoroethyl)-5-phenyl-1,3-dihydro-
  2H-1,4-benzodiazepine-2-one
8-trifluoromethyl-1-(2,2,2-trifluoroethyl)-5-phenyl-
  1,3-dihydro-2H-1,4-benzodiazepine-2-one
6-chloro-1-(2,2,2-trifluoroethyl)-5-phenyl-1,3-dihydro-
  2H-1,4-benzodiazepine-2-one, respectively.

Example 10.—7-chloro-1-(2,2,2-trifluoroethyl)-5-phenyl-1,3-dihydro-2H-1,4-benzodiazepine-2-one (A) P-chloro-N-(2,2,2-trifluoroethyl) - aniline.—Add dropwise with stirring 286 gms. of 2,2,2-trifluoroethyl trichloromethyl sulfonate to a refluxing solution of 319 gms. of p-chloroaniline in 800 ml. of toluene. Reflux the reaction mixture for 10 hours, cool and filter off the solid material. Extract the filtrate with dilute hydrochloric acid. Evaporate the toluene and distil the residue under reduced pressure to obtain the p-chloro-N-(2,2,2,-trifluoroethyl)-aniline boiling at 116°–119° C./16 mm.

(B) 2-(2,2,2 - trifluoroethylamino)-5-chlorobenzophenone.—Stir 5 gms. of the product from step A above with 15.5 gms. of anhydrous aluminum chloride and 8.2 gms. of benzoyl chloride in 40 ml. of carbon disulfide for 3 hours at room temperature. Heat the mixture to reflux and maintain for an additional 3 hours. Add an ice cold solution of dilute hydrochloric acid. Separate the solvent layers and remove the carbon disulfide by distillation to a residue. Dissolve the residue in an aqueous alcoholic hydrochloric acid solution and reflux the solution for 1 hour. Cool the solution and extract with ethyl ether to remove the desired product. Wash the ethereal extract with water to remove the excess acid and concentrate the extract to a residue. Dissolve the residue in a minimum volume of 2:1 hexane: benzene and process as in Example 9 step B to yield the title product of this step melting at 100° C.

(C) 2 - [N - (2,2,2 - trifluoroethyl) - 2 - bromoacetamido]-5-chlorobenzophenone.—Perform the process described in Example 9 step C above on 2-(2,2,2-trifluoroethylamino)-5-chlorobenzophenone to yield the title product melting at 114°–117° C.

(D) 7 - chloro - 1 - (2,2,2 - trifluoroethyl) - 5 - phenyl-1,3-dihydro-2H-1,4-benzodiazepine-2-one.—Perform the process of Example 9 step D on the product from step C above to yield the product of this example.

Example 11.—7-chloro-1-(2,2,2-trifluoroethyl)-5-phenyl-1,3-dihydro-2H-1,4-benzodiazepine-2-one (A) N - (α - bromoacetamido) - P - chloro - N - (2,2,2-trifluoroethyl)-aniline.—Reflux a solution of 20 gms. p-chloro-N-(2,2,2-trifluoroethyl)-aniline as prepared in step A of Example 10 above with 19 gms. of α-bromoacetyl bromide in 400 ml. of benzene. Continue the reflux for 3 hours and cool the mixture to room temperature. Wash the benzene solution with water and dry it over anhydrous sodium sulfate. Evaporate the benzene and crystallize the residue to give the N-(α-bromoacetamido)-p-chloro-N-(2,2,2-trifluoroethyl)-aniline.

(B) 5 - chloro - 2 - [N - (2,2,2 - trifluoroethyl) - 2-bromoacetamido]-benzophenone.—Dissolve 11 gms. of the product from step A above in carbon disulfide, add 13 gms. of anhydrous aluminum chloride and 7 gms. of benzoyl chloride and stir at room temperature for 18 hours. Add an ice cold solution of dilute hydrochloric acid and stir the mixture for 10 to 15 minutes. Separate the solvent layers and process as in step C Example 9 above to obtain the title product melting 115°–117° C.

(C) 7 - chloro - 1 - (2,2,2 - trifluoroethyl) - 5 phenyl-1,3 - dihydro-2H-1,4-benzodiazepine-2-one.—Dissolve the product of step B above in chloroform and subject the solution to the process of Example 9 step D to obtain the title product whose melting point is 164°–166° C.

Example 12.—7-chloro-1-(2,2,2-trifluoroethyl)-5-phenyl-1,3-dihydro-2H-1,4-benzodiazepine-2-one-4-oxide (A) 2 -[2 - (N - acetoxyacetamido) - N (2,2,2 - trifluoroethyl) - acetamido] - 5 - chlorobenzophenone.—Dissolve 31.4 gms. of 2-(2,2,2-trifluoroethylamino)-5-chlorobenzophenone and 19.4 gms. of N-acetoxy-N-acetylglycyl chloride in 500 ml. of benzene and heat the solution to reflux. Hold the solution at reflux for 3 hours and remove the benzene under reduced pressure. Crystallize the residue from an acetone-petroleum ether mixture to give the product of this example.

(B) 7 - chloro - 1 - (2,2,2 - trifluorethyl) - 5 - phenyl-1,3 - dihydro - 2H - 1,4 - benzodiazepine - 2 - one - 4 - oxide.—Dissolve 27 gms. of the product of step A above in 100 ml. of ethyl alcohol. Add 10 ml. of 15% hydrochloric acid and reflux for 15 minutes. Dilute with water and chill the mixture. Collect the solids by filtration. Wash the solids with mother liquor and with water and dry at 50° C. Crystallize the solids from alcohol to yield the product of this example.

Example 13.—7-chloro-1-(2,2,2-trifluoroethyl)-5-phenyl-1,3-dihydro-2H-1,4-benzodiazepine-2-one Prepare 20 ml. of a saturated solution of hydrogen bromide in acetic acid and cool to room temperature. Add to this solution 2 grams of 2-[2-carbobenzoxamido-N -(2,2,2 - trifluoroethyl)] acetamido-5-chlorobenzophenone and stir the mixture for 1 hour. Concentrate the solution under reduced pressure and below 35° C. to a residue and add ether (20 ml.) to give a pasty suspension. Add 20 ml. of cold dilute (2 N) ammonium hydroxide and mix thoroughly. Separate the solvent layers and dry the ether layer over anhydrous sodium sulfate. Evaporate the solution to a residue to obtain the 2-[N-glycyl-N-(2,2,2-trifluoroethyl)] amino-5-chlorobenzophenone.

(B) 7 - chloro - 1 - (2,2,2 - trifluoroethyl) - 5 - phenyl-1,3 - dihydro - 2H-1,4-benzodiazepine-2-one.—Dissolve 1 gram of the product from step above in 25 ml. of xylene. Reflux the mixture for 3 hours and remove the solvent under reduced pressure to a residue and crystallize the residue from acetone-petroleum ether to obtain the title compound.

Example 14.—7-chloro-1-(2,2,2-trifluoroethyl)-5-phenyl-1,3-dihydro-2H-1,4-benzodiazepine-2-one Dissolve 10 grams of 2-[N-phthalimidoacetyl-N-(2,2,2-trifluoroethyl)] amino-5-chlorobenzophenone in a mixture of 100 ml. of chloroform and 100 ml. of ethanol. Add a solution of 2.5 grams of hydrazine hydrate in 2.5 ml. of water. Allow the mixture to stand at room temperature for 24 hours and remove the solvents under reduced pressure at or below 35° C. Triturate the residue with a 1:1 mixture of 2 N ammonium hydroxide and ether until the solids have dissolved. Separate the solvent layers and extract the ether layer with a 10% hydrochloric acid solution. Basify the acid extract and back-extract it with ether. Evaporate the ether layer to a residue and crystallize the product to obtain the 7-chloro-1-(2,2,2-trifluoroethyl)-5-phenyl-1,3-dihydro-2H-1,4-benzodiazepine-2-one product of this example melting 164°–165.5° C.

Example 15.—2-(2-amino-5-chlorobenzoyl) pyridine

Add a solution of 13.6 g. of chlorine in 50 ml. of glacial acetic acid over 15 min. to a cold stirred solution of 35.7 g. of 2-(2-aminobenzoyl) pyridine in 25 ml. of glacial acetic acid. Stir the mixture for 15 minutes and allow to stand overnight at room temperature. Remove the solvent under reduced pressure, heat the residue with 500 ml. of hot water and allow to cool. After a few days filter off the solid which has deposited and recrystallize from ligroin (B.P. 90–120°) to give the product of this example, M.P. 99–101°.

Alternatively, by substituting the 2-(2-aminobenzoyl) pyridine with equivalent quantities of 3-(2-aminobenzoyl) pyridine;
4-(2-aminobenzoyl) pyridine;
2-(2-aminobenzoyl) pyrimidine;
4-(2-aminobenzoyl) pyrimidine;
3-(2-aminobenzoyl) pyridiazine;
4-(2-aminobenzoyl) pyridiazine;
2-(2-aminobenzoyl) pyrazine;
2-(2-aminobenzoyl) thiophene;
3-(aminobenzoyl) thiophene;
2-(2-aminobenzoyl) furan;
3-(aminobenzoyl) furan;
2-(aminobenzoyl) thiazole;
4-(aminobenzoyl) thiazole;
2-(aminobenzoyl) oxazole;
4-(aminobenzoyl) oxazole and by substantially following the procedure of this step, there is produced 3-(2-amino-5-chlorobenzoyl) pyridine;
4-(2-amino-5-chlorobenzoyl) pyridine;
2-(2-amino-5-chlorobenzoyl) pyrimidine;
4-(2-amino-5-chlorobenzoyl) pyrimidine;
3-(2-amino-5-chlorobenzoyl) pyridiazine;
4-(2-amino-5-chlorobenzoyl) pyridiazine;
2-(2-amino-5-chlorobenzoyl) pyrazine;
2-(2-amino-5-chlorobenzoyl) thiophene;
3-(2-amino-5-chlorobenzoyl) thiophene;
2-(2-amino-5-chlorobenzoyl) furan;
3-(2-amino-5-chlorobenzoyl) furan;
2-(2-amino-5-chlorobenzoyl) thiazole;
4-(2-amino-5-chlorobenzoyl) thiazole;
2-(2-amino-5-chlorobenzoyl) oxazole and
4-(2-amino-5-chlorobenzoyl) oxazole.

Example 16.—2-(2-amino-5-bromobenzoyl) pyridine (a) Cyclize 2 - phenacrylpyridine p-bromophenylhydrazone with concentrated hydrochloric acid to give 5-bromo-2-phenyl-3-(3-pyridyl) indole, M.P. 175–177°. Oxidize this compound with chromiumtrioxide to give 2-(2-benzamido-5-bromobenzoyl) pyridine, M.P. 138–140°. Hydrolyze the latter with concentrated hydrochloric acid affording after recrystallization from ligroin (B.P. 90–120°) the product of this example, M.P. 96–98°.

(b) Add a solution of 35 ml. of bromine to 630 ml. of glacial acetic acid, dropwise, to a stirred solution of 131 g. of 2-(2-aminobenzoyl) pyridine at 15–20°. Allow the reaction mixture to warm to room temperature and stir for 20 hours. Filter off the red crystalline hydrobromide and wash with cold glacial acetic acid. Liberate the base by decomposing the salt with 2.5 l. of water. Separate the product by filtration, dry, and recrystallize from ligroin (B.P. 90–120°) to give the product of this example, M.P. 96–98°.

Similarly produced (by starting with the appropriately substituted reactant and by following substantially the same procedure outlined above) are the chemical intermediates:

3-(2-amino-5-bromobenzoyl) pyridine;
4-(2-amino-5-bromobenzoyl) pyridine;
2-(2-amino-5-bromobenzoyl) pyridine;
2-(2-amino-5-bromobenzoyl) pyrimidine;
4-(2-amino-5-bromobenzoyl) pyrimidine;
3-(2-amino-5-bromobenzoyl) pyridiazine;
4-(2-amino-5-bromobenzoyl) pyridiazine;
2-(2-amino-5-bromobenzoyl) pyrazine;
2-(2-amino-5-bromobenzoyl) thiophene;
3-(2-amino-5-bromobenzoyl) thiophene;
2-(2-amino-5-bromobenzoyl) thiophene;
2-(2-amino-5-bromobenzoyl) furan;
3-(2-amino-5-bromobenzoyl) furan;
2-(2-amino-5-bromobenzoyl) thiazole;
4-(2-amino-5-bromobenzoyl) thiazole;

2-(2-amino-5-bromobenzoyl) oxazole and
4-(2-amino-5-bromobenzoyl) oxazole.

Example 17.—7-chloro-5-(2-pyridyl)-1,3-dihydro-
2H-1,4-benzodiazepine-2-one

Reflux 10 g. of 2-(2-amino-5-chlorobenzoyl) pyridine and 7 g. of glycine ethyl ester hydrochloride in 100 ml. of pyridine for 5 hrs. Distill off 59 ml. of pyridine over a 3 hr. period. Add another 7 g. of glycine ethyl ester hydrochloride and 75 ml. of pyridine and reflux for 2 hrs. more. Remove 80 ml. of pyridine by slow distillation over a 2 hr. period. Concentrate the solution under reduced pressure and add 250 ml. of benzene and 250 ml. of water to the residue. After stirring separate the benzene layer, wash with water, dry over sodium sulfate, dilute with benzene and cool to obtain, upon filtration, the product of this example which may be purified by crystallization from acetone.

Similarly, by starting with the appropriately substituted reactants and by following substantially the same procedure outlined above, the following chemical intermediates are produced:

7-chloro-5-(3-pyridyl)-1,3-dihydro-2H-1,4-benzodi-
azepine-2-one;
7-chloro-5-(4-pyridyl)-1,3-dihydro-2H-1,4-benzodi-
azepine-2-one;
7-chloro-5-(2-pyridyl)-1,3-dihydro-2H-1,4-benzodi-
azepine-2-one;
7-bromo-5-(2-pyridyl)-1,3-dihydro-2H-1,4-benzodi-
azepine-2-one;
7-bromo-5-(3-pyridyl)-1,3-dihydro-2H-1,4-benzodi-
azepine-2-one, and
7-bromo-5-(4-pyridyl)-1,3-dihydro-2H-1,4-benzodi-
azepine-2-one.

Example 18.—5-(2-pyridyl)-1,3-dihydro-1,4-
benzodiazepine-2-one

Reflux 20 g. of 2-(2-aminobenzoyl) pyridine and 21 g. of glycine ethyl ester hydrochloride in 1 l. of pyridine for 4 hrs. Distil off 500 ml. of pyridine. Add another 21 g. of the glycine, stir salt and 500 ml. of pyridine, reflux for 4 hrs. and distill off 600 ml. of pyridine. Concentrate the reaction mixture further to a dark solid residue and add water and 500 ml. of benzene. Separate the benzene layer. Reextract the aqueous layer with another 500 ml. of benzene. Wash the combined benzene extracts with water, concentrate to 250 ml., add 250 ml. of petroleum ether and chill. Filter off the crude product and recrystallize from acetone to give the product of this example, M.P. 231–232°.

Similarly by employing the appropriate 2-(2-amino-benzoyl)pyridine isomer there is produced 5-(3-pyridyl)-1,3 - dihydro - 1,4 - benzodiazepine-2-one; 5-(4-pyridyl)-1,3-dihydro-1,4-benzodiazepine-2-one;

Example 19.—7-nitro-5-(2-pyridyl)-1,3-dihydro-
1,4-benzodiazepine-2-one

Add a solution of 50.4 g. of potassium nitrate in 300 ml. of concentrated sulfuric acid over 1 hr. to a stirred solution of 112 g. of 5-(2-pyridyl)-1,3-dihydro-1,4-benzodiazepine-2-one in 1 l. of concentrated sulfuric acid at 5°. Stir for an additional 1.5 hrs. at 5° and then pour the nitration mixture onto ice. Add, with stirring, 4.5 l. of concentrated ammonium hydroxide solution to the clear yellow solution at 5°. Filter off the precipitated solid and crystallize from alcohol to give the product of this example, M.P. 253–256°.

Similarly by employing the appropriate isomeric starting material there is produced 7-nitro-5-(3-pyridyl)-1,3-dihydro-1,4-benzodiazepine-2-one; 7-nitro-5-(4-pyridyl)-1,3-dihydro-1,4-benzodiazepine-2-one.

Example 20.—2-[2-(2,2,2-trifluoroethyl) amino-5-chloro-
benzoyl] pyridine

Heat with stirring at 160° for 5 hrs. a mixture of 100 g. of 2-(2-amino-5-chlorobenzoyl) pyridine and 60 g. of 2,2,2-trifluoroethyl trichloromethylsulfonate. Cool the reaction mixture and add 2 l. ether. Filter off the solid, evaporate most of the ether and add 500 ml. of benzene. Filter off the further quantity of solid which separates and concentrate the filtrate. Dissolve the residual oil in the minimum volume of a 1:1 benzene-hexane solvent mixture and add the solution to the top of a silica gel chromatography column prepared for 1000 g. of silica gel in 1:1 benzene-benzene. Elute the column with 1:1 benzene-hexane followed by solvent mixtures of increasing polarities collecting 750 ml. fractions. Combine the appropriate eluates and recrystallize from benzene-hexane to give the product of this example.

Similarly by employing the appropriate starting compound there is produced

3-[2-(2,2,2-trifluoroethyl) amino-5-chlorobenzoyl]
pyridine;
4-[2-(2,2,2-trifluoroethyl) amino-5-chlorobenzoyl]
pyridine;
2-[2-(2,2,2-trifluoroethyl) amino-5-bromobenzoyl]
pyridine;
3-[2-(2,2,2-trifluoroethyl) amino-5-bromobenzoyl]
pyridine;
4-[2-(2,2,2-trifluoroethyl) amino-5-bromobenzoyl]
pyridine;
2-[2-(2,2,2-trifluoroethyl) amino-5-nitrobenzoyl]
pyridine;
3-[2-(2,2,2-trifluoroethyl) amino-5-nitrobenzoyl]
pyridine; and
4-[2-(2,2,2-trifluoroethyl amino-5-nitrobenzoyl]
pyridine.

Example 21.—2-[2-{N-(2,2,2-trifluoroethyl)-α-bromo-
acetamido}-5-chlorobenzoyl] pyridine Reflux a mixture of 40 g. of 2-[2-(2,2,2-trifluoroethyl) amino-5-chlorobenzoyl] pyridine, 31 g. of bromoacetyl bromide and 21.2 g. of anhydrous potassium carbonate in 750 ml. of benzene for 3 hrs. Filter the cooled reaction mixture, wash the benzene solution with a total of 450 ml. of water and dry over anhydrous sodium sulfate. Evaporate the benzene and crystallize the residue from benzene to give the product of this example.

Similarly by starting with the appropriate starting compound there is produced

3-[2-{N-(2,2,2-trifluoroethyl-α-bromoacetamido}-5-
chlorobenzoyl] pyridine;
4-[2-{N-(2,2,2-trifluoroethyl-α-bromoacetamido}-5-
chlorobenzoyl] pyridine;
2-[2-{N-(2,2,2-trifluoroethyl)-α-bromoacetamido}-5-
bromobenzoyl] pyridine;
3-[2-{N-(2,2,2-trifluoroethyl)-α-bromoacetamido}-5-
bromobenzoyl] pyridine;
4-[2-{N-(2,2,2-trifluoroethyl)-α-bromoacetamido}-5-
bromobenzoyl] pyridine;
2-[2-{N-(2,2,2-trifluoroethyl)-α-bromoacetamido}-5-
nitrobenzoyl] pyridine;
3-[2-{N-(2,2,2-trifluoroethyl)-α-bromoacetamido}-5-
nitrobenzoyl] pyridine; and
4-[2-{N-2,2,2-trifluoroethyl)-α-bromoacetamido}-5-nitro-
benzoyl] pyridine.

Also included in this invention are those analogs of Formulae I and II, and intermediates therefore, wherein the polyfluoroalkyl radical in the 1-position thereof have been replaced by another polyhaloalkyl grouping such as a polychloroalkyl, polybromoalkyl and a polyiodoalkyl radical. Such compounds, although of somewhat limited activity than their polyfluoroalkyl analogs, possess the same therapeutic utilities and such compounds may be prepared according to the same techniques disclosed above for the corresponding polyfluoroalkyl compounds.

I claim:

1. A compound selected from the group consisting of 1,4-benzodiazepines having one of the structural formulae:

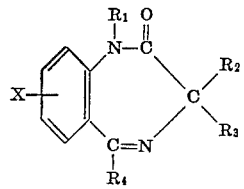 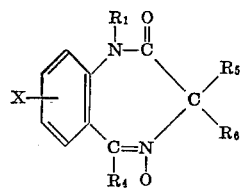

wherein X is a member of the group consisting of hydrogen, halogen, trifluoromethyl, nitro, lower alkyl, and lower alkoxy, $R_1$ is polyfluoro lower alkyl, $R_2$ is a member of the group consisting of hydrogen, lower alkyl, hydroxy, and lower alkanoyloxy, $R_3$ is a member of the group consisting of hydrogen and lower alkyl with the proviso that when $R_2$ is hydroxy or lower alkanoyloxy $R_3$ is hydrogen, $R_5$ and $R_6$ are members of the group consisting of hydrogen and lower alkyl, $R_1$ is polyfluoroalkyl, $R_4$ is a member of the group consisting of phenyl, X-substituted phenyl and a heterocycle wherein said heterocycle is selected from the group consisting of pyridyl, pyrimidyl, pyridazinyl, pyrazinyl, thienyl, furyl, thiazoyl and oxazoyl, and when $R_4$ represents a heterocycle the acid addition salts thereof.

2. A compound of claim 1 of the structural formula:

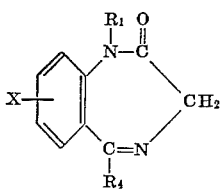

wherein X is halogeno, $R_1$ is polyfluoro lower alkyl, and $R_4$ is phenyl.

3. A compound of claim 1 of the structural formula:

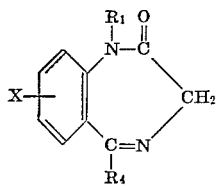

wherein X is halogeno, $R_1$ is polyfluorolower alkyl and $R_4$ is pyridyl.

4. A compound of claim 1 of the structural formula:

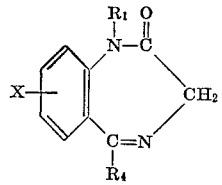

wherein X is nitro, $R_1$ is polyfluorolower alkyl and $R_4$ is phenyl.

5. A compound of claim 1 having the structural formula:

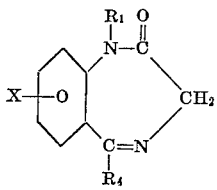

wherein X is nitro, $R_1$ is polyfluorolower alkyl and $R_4$ is pyridyl.

6. A compound of claim 2 wherein X is chloro, said compound being 7-chloro-1-(2,2,2-trifluoroethyl)-5-phenyl-1,3-dihydro-2H-1,4-benzodiazepine-2-one.

7. A compound of claim 2 wherein X is bromo, said compound being 7-bromo-1-(2,2,2-trifluoroethyl)-5-phenyl-1,3-dihydro-2H-1,4-benzodiazepine-2-one.

8. A compound of claim 4, said compound being 7 - nitro - 1 - (2,2,2 - trifluoroethyl) - 5 - phenyl - 1,3-dihydro-2H-1,4-benzodiazepine-2-one.

9. A compound of claim 3 wherein $R_4$ is 2-pyridyl and X is chloro, said compound being 7-chloro-1-(2,2,2-trifluoroethyl) - 5 - (2 - pyridyl) - 1,3 - dihydro - 2H - 1,4-benzodiazepine-2-one.

10. A compound of claim 5 wherein $R_4$ is 2-pyridyl, said compound being 7-nitro-1-(2,2,2-trifluoroethyl)-5-(2-pyridyl)-1,3-dihydro-2H-1,4-benzodiazepine-2-one.

11. A compound of claim 1 wherein $R_1$ is trifluoroethyl, $R_2$ is hydroxyl, $R_3$ is hydrogen, $R_4$ is phenyl and X is chloro, said compound being 7-chloro-1,3-dihydro-3-hydroxy - 5 - phenyl - 1 - (2,2,2 - trifluoroethyl) - 2H-1,4-benzodiazepine-2-one.

References Cited

UNITED STATES PATENTS

| | | | |
|---|---|---|---|
| 3,100,770 | 8/1963 | Fryer et al. | 260—239.3 |
| 3,182,054 | 5/1965 | Sternbach et al. | 260—239.3 |
| 3,182,065 | 5/1965 | Fryer et al. | 260—239.3 |

HENRY R. JILES, *Primary Examiner.*

R. T. BOND, *Assistant Examiner.*

U.S. Cl. X.R.

260—562, 570, 347.7, 347.3, 307, 302, 306.8, 295, 296, 256.4, 251, 250, 329, 333.3, 333.2, 999

UNITED STATES PATENT OFFICE
CERTIFICATE OF CORRECTION

Patent No. 3,429,874                                February 25, 1969

John G. Topliss

It is certified that error appears in the above identified patent and that said Letters Patent are hereby corrected as shown below:

Column 3, lines 57 to 65, formula III should appear as shown below:

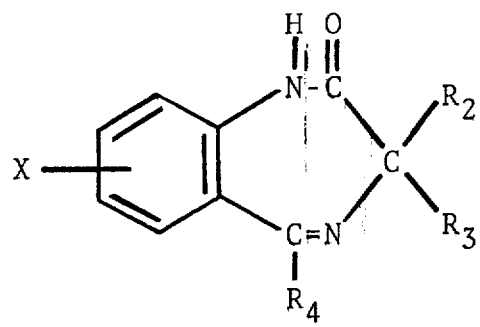

Column 4, lines 63 to 69, formula IX should appear as shown below

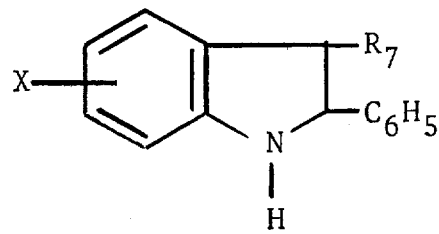

Column 8, lines 46 to 54, formula XXXI should appear as shown below:

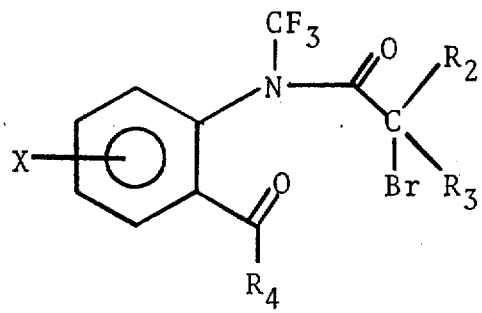

Column 9, line 72, "1(2,2-trifluoroethyl)" should read -- 1(2,2,2-trifluoroethyl) --. Column 18, line 12, "1.0 filter" should read -- 1.0 liter --. Column 22, line 37, "Phenacryl-pyridine" should read -- Phenacylpyridine --. Column 23, line 8, "59 ml." should read -- 50 ml. --.

Signed and sealed this 31st day of March 1970.

(SEAL)
Attest:

EDWARD M. FLETCHER, JR.
Attesting Officer

WILLIAM E. SCHUYLER, JR.
Commissioner of Patents